US009131364B2

(12) United States Patent
Howard et al.

(10) Patent No.: US 9,131,364 B2
(45) Date of Patent: Sep. 8, 2015

(54) INTELLIGENT SIM SELECTION SUPPORTING RICH CONTEXT OF INPUT FACTORS

(71) Applicants: Gregory Howard, Kirkland, WA (US); Susan Chory, Seattle, WA (US); Tony He, Kirkland, WA (US)

(72) Inventors: Gregory Howard, Kirkland, WA (US); Susan Chory, Seattle, WA (US); Tony He, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 14/079,486

(22) Filed: Nov. 13, 2013

(65) Prior Publication Data

US 2015/0017962 A1  Jan. 15, 2015

Related U.S. Application Data

(63) Continuation-in-part of application No. 13/942,621, filed on Jul. 15, 2013.

(51) Int. Cl.
*H04W 4/12* (2009.01)
*H04W 8/22* (2009.01)
*H04M 1/725* (2006.01)
*H04W 4/00* (2009.01)
*H04W 8/18* (2009.01)

(52) U.S. Cl.
CPC ............ *H04W 8/22* (2013.01); *H04M 1/72519* (2013.01); *H04W 4/003* (2013.01); *H04W 4/12* (2013.01); *H04W 8/18* (2013.01)

(58) Field of Classification Search
USPC .................................................. 455/418, 558
See application file for complete search history.

(56) References Cited

U.S. PATENT DOCUMENTS

| 7,610,057 | B2 | 10/2009 | Bahl et al. |
|---|---|---|---|
| 8,082,523 | B2 | 12/2011 | Forstall et al. |
| 8,170,614 | B2 | 5/2012 | Kim |
| 8,249,603 | B2 | 8/2012 | Yach |
| 8,270,983 | B2 | 9/2012 | Yach |
| 8,364,205 | B2 | 1/2013 | Tsai et al. |
| 8,385,976 | B2 | 2/2013 | Middleton |
| 2005/0239497 | A1 | 10/2005 | Bahl et al. |
| 2006/0234693 | A1 | 10/2006 | Isidore et al. |
| 2007/0060199 | A1 | 3/2007 | Cheng |

(Continued)

FOREIGN PATENT DOCUMENTS

| AU | 2008100537 | 7/2008 |
|---|---|---|
| WO | WO 2013093555 | 6/2013 |
| WO | WO 2013093559 | 6/2013 |

OTHER PUBLICATIONS

Tidwell, *Designing Interfaces*, Chapter 7, "Getting Input from Users: Forms and Controls," pp. 206-240, 2006, 37 pages.

(Continued)

*Primary Examiner* — Diane Mizrahi
(74) *Attorney, Agent, or Firm* — Brandon Roper; Judy Yee; Micky Minhas

(57) ABSTRACT

Various user interfaces and other technologies for interacting with devices that support multiple SIM cards can be implemented. For example, intelligent handling of SIM card selection can help users deal with multiple SIM card scenarios. A user interface for overriding SIM card selection can be supported. Users can interact with their devices more efficiently and with less frustration. A wide variety of use default SIM card scenarios are supported. SIM cards can be selected based on any of a rich set of input factors.

20 Claims, 22 Drawing Sheets

(56) References Cited

U.S. PATENT DOCUMENTS

| | | | |
|---|---|---|---|
| 2007/0129103 | A1 | 6/2007 | Al-Shaikh |
| 2008/0280639 | A1 | 11/2008 | Alfia |
| 2009/0170519 | A1 | 7/2009 | Wilhoite et al. |
| 2009/0191864 | A1 | 7/2009 | Mousseau et al. |
| 2009/0221323 | A1 | 9/2009 | Yach |
| 2010/0159901 | A1 | 6/2010 | Vander Veen et al. |
| 2011/0064028 | A1 | 3/2011 | Hinrikus et al. |
| 2011/0314374 | A1 | 12/2011 | Chae |
| 2012/0135715 | A1 | 5/2012 | Kang et al. |
| 2013/0137484 | A1* | 5/2013 | Torres ............... 455/558 |
| 2013/0150013 | A1 | 6/2013 | Liu et al. |
| 2013/0288749 | A1* | 10/2013 | Torres ............... 455/558 |
| 2014/0073291 | A1 | 3/2014 | Hildner et al. |
| 2014/0335915 | A1* | 11/2014 | Torres ............... 455/558 |
| 2015/0017962 | A1 | 1/2015 | Howard et al. |
| 2015/0018040 | A1* | 1/2015 | He et al. ............ 455/558 |

OTHER PUBLICATIONS

"IPF F20 for Windows," Simton IPX, visited May 24, 2013, 1 page.
"Sony Xperial E dual review: Something extra," p. 6, Feb. 11, 2013, 4 pages.
"Sony Xperial E dual review: Something extra," p. 9, Feb. 11, 2013, 3 pages.
"Dual Sim," *Wikipedia*, visited Apr. 24, 2013, 4 pages.
Feature Suggestion, "Is Windows Phone 8 dual Sim compatible?" windowsphone.uservoice.com, Oct. 6, 2012, with comments through Apr. 9, 2013, 3 pages.
"Detailed specifications for the Nokia Asha 308 Dual SIM," www.nokia.com, visited Apr. 24, 2013, 3 pages.
"User Guide, Noika 308," Nokia, English, retrieved Apr. 24, 2013, 128 pages.
"Dual Sim: Get double the benefits with a Dual SIM phone," Nokia, visited Apr. 24, 2013, 3 pages.
"Galaxy Y Pro Duos," Samsung, visited Apr. 24, 2013, 2 pages.
Daniel, "How to manage your dual-sim Android phone," GizChina.com, Nov. 9, 2012, with comments through Apr. 24, 2013, 18 pages.
"Samsung Galaxy Ace Duos (GT-S6802) Review," *Living Android* blog, visited Apr. 24, 2013, 11 pages.
Lemon T109 Dual Sim Mobile, *India Times* Shopping, visited Apr. 24, 2013, 2 pages.
Lemon T109 Dual Sim Mobile, detail image, *India Times* Shopping, visited Apr. 24, 2013, 1 page.
"UICC," *Wikipedia*, visited May 30, 2013, 2 pages.
Dubey, "Android Goes Dual SIM: MOTOROLA XT800" retrieved from http://articles.economictimes.indiatimes.com/2011-02-09/news/28427863_1_dual-sim-android-phone-xt800-connectivity, Feb. 9, 2011, 3 pages.
Roelofs, "Samsung Galaxy S Duos review," screenshot, GSMinfo.nl, Nov. 26, 2012, 1 page.
Hot HD9 (Dual SIM)—Part II,"smartphone reviews," bm-smartphone-reviews.blogspot.com, Jan. 21, 2011, 4 pages.
International Search Report and Written Opinion issued in corresponding PCT Application No. PCT/US2014/046456, mailed Oct. 21, 2014, 9 pages.
International Search Report and Written Opinion issued in PCT Application No. PCT/US2014/046454 (corresponding to parent), mailed Oct. 21, 2014, 9 pages.
Roelofs, "Samsung Galaxy S Duos review," GSMinfo.nl, with machine English translation, Nov. 26, 2012, 25 pages.
"Hot HD9 (Dual SIM)—Part I," smartphone reviews, bm-smartphone-reviews.blogspot.com, Jan. 16, 2011, 16 pages.
Hot HD9 (Dual SIM)—Part II, smartphone reviews, bm-smartphone-reviews.blogspot.com, Jan. 21, 2011, 4 pages.
Second Written Opinion issued in PCT Patent Application No. PCT/US2014/046454, corresponding to U.S. Appl. No. 13/942,621, mailed Jun. 12, 2015, 4 pages.

* cited by examiner

| DEFAULT SIM TABLE ||
|---|---|
| CONTACT POINT | DEFAULT SIM |
| ELLEN ADAMS, WORK | 2 |
| ELLEN ADAMS, MOBILE | 1 |
| ALLEN BREWER, WORK | 2 |

1730

1730A

1730B

1700

FIG. 17

INTELLIGENT SIM SELECTION SUPPORTING RICH CONTEXT OF INPUT FACTORS

CROSS REFERENCE TO RELATED APPLICATION

This application is a continuation-in-part of U.S. patent application Ser. No. 13/942,621, filed on Jul. 15, 2013, which is hereby incorporated herein by reference.

BACKGROUND

Mobile phones that accommodate multiple subscriber identity module (SIM) cards are becoming widespread. However, the user experience for such phones leaves much to be desired. For example, many such phones still have user interfaces and logic that were originally developed for a single SIM card and incorporate multiple SIM functionality merely as an afterthought. Others simply fail to incorporate the expectations of users when dealing with multiple SIM cards.

For example, having more than one SIM card in a phone is a great feature, but there must be some mechanism for switching between the SIM cards. One such mechanism uses a default SIM card technique. For example, if there is one phonebook per SIM, a default SIM card can be chosen based on the phonebook in which a dialed number resides. However, such a simplistic approach overlooks the numerous usage scenarios and factors that a user might wish to go into selecting the desired SIM card as described herein.

So, there is an absence of technologies that can intelligently select a SIM card in light of a variety of communication situations.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

A wide variety of factors can be incorporated into the determination of which SIM card to use when engaging in communications. As described herein, a SIM selection engine can consider a rich variety of factors including the nature of the contact, contact point, related message content, past user behavior, time-of-day, location, or the like. Flexibility of the technologies allows SIM selection to progress beyond the concept of a global default SIM so that an appropriate SIM can be selected at a more granular level according to existing circumstances.

The technologies can in effect predict which SIM a user will select and present the predicted choice. However, as described herein, a user can override the prediction as desired.

In one embodiment, a method implemented at least in part by a computing system includes selecting a default SIM card; displaying a user interface depicting a plurality of contact points for a contact and an activatable user interface element for initiating communications with a particular contact point for the contact; receiving an activation of the user interface element; responsive to activation of the user interface element, initiating communications with the particular contact point via the default SIM card; and for another of the contact points of the contact, presenting a different SIM card as a default.

In another embodiment, system for implementing default SIM cards includes a processor; memory coupled to the processor; a SIM card default engine configured to output a default SIM card; and a default SIM card table, wherein the default SIM card table comprises a mapping between contact points and a default SIM, wherein the default SIM card table supports different default SIMs for different contact points of a same contact.

In another embodiment, one or more computer-readable storage media include computer-executable instructions causing a computer to perform a method of selecting a default SIM card for a contact point associated with a contact, the method comprising: receiving a plurality of input factors comprising a source of the contact point; selecting a default SIM card for the contact point based on the source of the contact point, wherein the selecting further supports factors comprising a SIM card on which the contact point resides, a SIM card from which the contact point was imported, and a SIM card most recently involved in communications activity with the contact point; and subsequently overriding the default SIM card selected for the contact point, wherein the overriding supports factors comprising explicit selection received from a user interface and signal strength associated with the default SIM card.

As described herein, a variety of other features and advantages can be incorporated into the technologies as desired.

BRIEF DESCRIPTION OF THE DRAWINGS

FIG. 17 is a block diagram of an exemplary table relating contact points and default SIMs.

DETAILED DESCRIPTION

Example 1

Exemplary Overview

Figure 1:
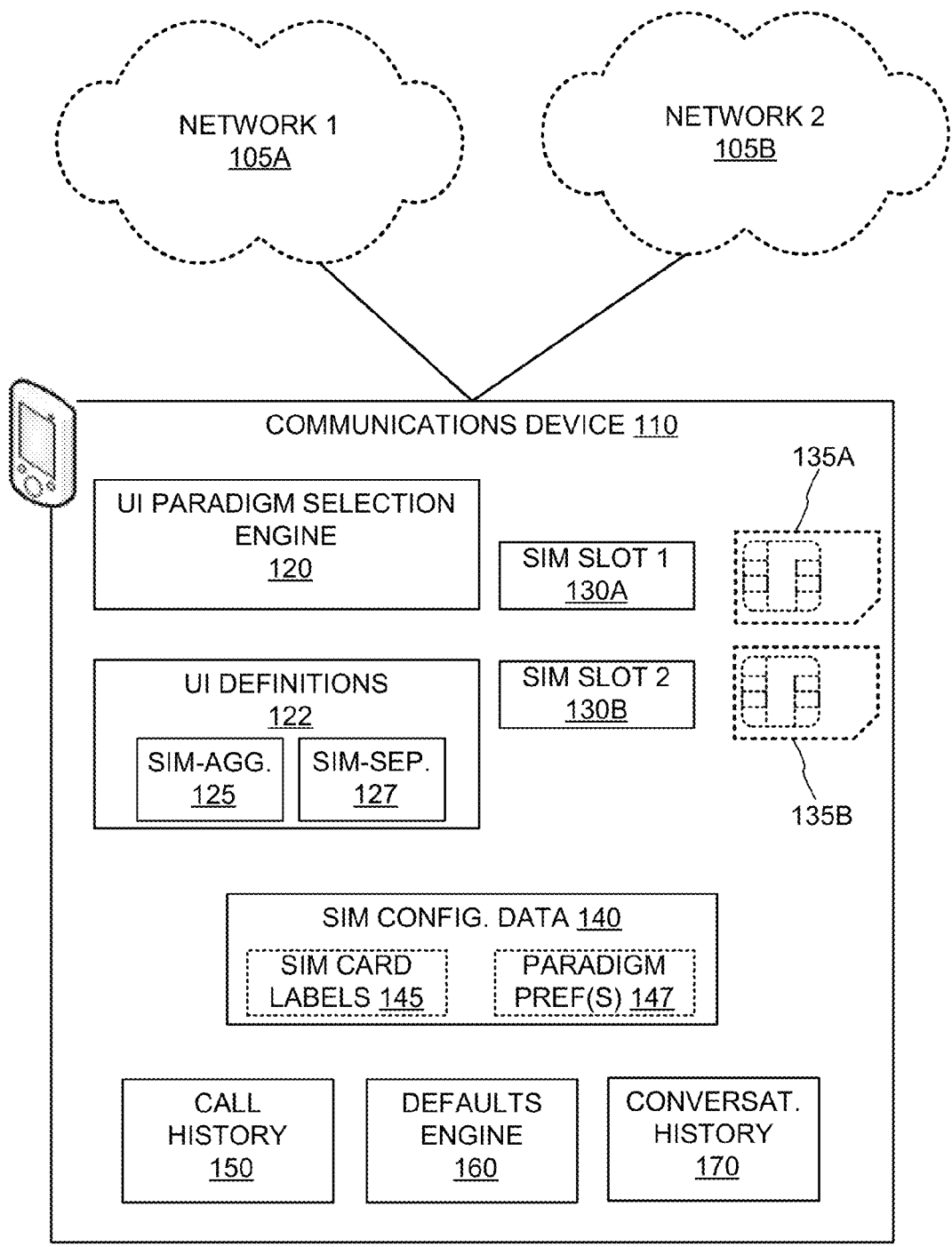
FIG. 1 is a block diagram of an exemplary system implementing user interfaces for multiple SIM cards.

The technologies described herein can be used for a variety of multiple SIM card scenarios, and adoption of the technologies can provide improved techniques for communicating via multiple SIM cards. The user interfaces and flow between them can better parallel common user scenarios. An overall superior user experience with better internal consistency, fewer errors, and more efficient communication can result.

Both SIM-separated and SIM-aggregated user interface paradigms can be supported. Users can set preferences to control whether user interfaces are aggregated or not. However, intelligent selection of the user interface paradigm can choose a different paradigm according to anticipated user expectations.

A user can control whether communications are separated for each SIM or whether they are presented in an aggregated list for easily viewing communications from multiple SIMs at once. For example, line-centric users can use a SIM-separated user interface paradigm, while people-centric users can use a SIM-aggregated user interface paradigm.

A user can independently choose different user interface paradigms via preferences for different communication types. For example, a user can choose to aggregate two SIM cards in user interfaces for phone calls, but maintain separate user interfaces (e.g., entry points, conversation lists, or the like) for messaging.

Users can take advantage of the technologies to easily switch between roles (e.g., work, home, and the like) and maintain privacy.

The technologies can be helpful for those wishing to provide users with more intelligent handling of communications in multiple SIM card scenarios. Beneficiaries can include those developing software for devices that support multiple SIMs. End users can also benefit from the technologies because they can communicate more intuitively and conveniently.

According to a SIM-separated user interface paradigm, calling and messaging experiences for different SIM cards can be separated on a single device by SIM card. The experience can emulate having two phones in one. Separate entry points into two different phone or messaging apps can be supported (e.g., via two different tiles as described herein).

Any number of techniques for providing easily recognizable information to differentiate activity or SIMs can be provided. A name, number, color, icon, or combinations thereof can be associated with a particular SIM card. For example, a work SIM can be associated with one color (e.g., blue), and the home SIM can be another color (e.g., red). Tiles for the home line can be portrayed in the home SIM color, as well as background call notifications, lock screen count, and the accent color for any application involving the home SIM.

Friendly names can be provided or chosen by a user to differentiate the two SIM cards and can be used throughout the user interfaces.

When communication is initiated, an appropriate default SIM card can be chosen based on a number of factors as described herein, including communications activity. SIM card defaults can be easily recognized in the user interfaces, and a SIM card indicator-switcher can be used to switch to another SIM card.

Various other features can be implemented and combined as described herein.

Example 2

Exemplary System Implementing User Interfaces for Multiple SIM Cards

FIG. 1 is a block diagram of an exemplary system 100 implementing user interfaces for multiple SIM cards as described herein.

For purposes of context, FIG. 1 shows that the communications device 110 can access the communication networks 105A, 105B via respective SIM cards 135A, 135B. The communications device 110 can be acquired or purchased with or without the SIM cards 135A, 135B, which fit into the SIM slots 130A, 130B. As described herein, some SIM cards can be of a software form, so a slot 130A, 130B is not strictly required.

The networks 105A, 105B can be provided by the same or different carriers; likewise the SIM cards 135A, 135B can be associated with the same or different carriers. Although two SIM cards are shown in the example, additional SIM cards can be supported by the described technologies.

In the example, the communications device 110 can display any of a wide variety of user interfaces. A user interface paradigm selection engine 120 can select a user interface paradigm, which can be implemented by user interface definitions 122. Both SIM-aggregated definitions 125 and SIM-separated definitions 127 can be supported to display user interfaces (e.g., on a display of the device 110) that implement a SIM-aggregated paradigm, a SIM-separated user interface paradigm, or both. As described herein, the engine 120 can control which user interface type is displayed and according to which paradigm. Although the engine 120 is depicted as a discrete element, in practice, user interface functionality can be integrated throughout the communications device 110 and can be accomplished via an operating system, applications, or combinations thereof implemented in hardware, software, or both.

Stored SIM configuration data 140 can include SIM card labels 145 (e.g., SIM card numbers, friendly names, and the like). Information from the configuration data 140 can be displayed in the user interfaces. Other configuration settings can comprise one or more paradigm preferences 147 by the user regarding which user interface paradigm is preferred; the paradigm preference can be different for different types (e.g., calls and messages) of communications. Although information is shown in examples as stored together, in practice, data can be spread throughout the system.

Further information for the user interfaces can be drawn from the call history 150 and the conversation history 170. A defaults engine 160 can take input from the call history 150 and the conversation history 170 to determine defaults (e.g., a SIM card default) as described herein. Alternatively, a running table of defaults per contact point can be maintained. Combinations of such techniques can be used. For example, defaults can be set according to history with a contact, then overridden as the user sees fit.

Although the engine 120 and SIM configuration data 140 are shown in separate boxes, in practice, component boundaries may vary. For example, the components can be provided as part of a phone operating system, application, or the like. Other arrangements are possible while still implementing the technologies.

In practice, the systems shown herein, such as system 100 can be more complicated, with additional functionality, more SIM cards, more networks, and the like.

The system 100 and any of the other systems described herein can be implemented in conjunction with any of the hardware components described herein, such as the computing systems described below (e.g., processing units, memory, and the like). In any of the examples herein, the inputs, outputs, and tools can be stored in one or more computer-readable storage media or computer-readable storage devices. The technologies described herein can be generic to the specifics of operating systems or hardware and can be applied in any variety of environments to take advantage of the described features.

Example 3

Exemplary User Interface Paradigms

In any of the examples herein, a user interface can implement a SIM-separated user interface paradigm, a SIM-aggregated user interface paradigm, or both.

A user interface can implement a SIM-separated user interface paradigm by separating (e.g., segregating) communications, contacts, or communication events for SIM cards into different user interface elements, lists, screens, or the like. In the SIM-separated user interface paradigm, a user interface element, list, screen, or the like can be limited to a single SIM card (e.g., portray information for a single SIM card only). Another way a user interface can implement a SIM-separated user interface paradigm is by presenting different user interface elements for navigating to a SIM-separated user interface (e.g., one user interface element for navigating to a SIM-separated user interface for a first SIM and another user interface element for navigating to a SIM-separated user interface for a second SIM). Thus, there can be plural separate user interfaces or elements for a respective number of SIM cards represented. A SIM-separate user interface can be limited to information regarding communications transmitted or received via a single SIM card.

A user interface can implement a SIM-aggregated user interface paradigm by presenting communications, contacts, or communication events for a plurality of SIM cards in a single instance of a user interface element, list, screen, or the like. Another way a user interface can implement a SIM-aggregated user interface paradigm is by presenting a single user interface element for navigating to a SIM-aggregated user interface that aggregates plural SIM cards. (e.g., a user interface element for navigating to a SIM-aggregated user interface that presents communication, contacts, or communication events for both a first SIM and a second SIM). Thus, a SIM-aggregated user interface can show information regarding at least one communication transmitted or received via a first SIM card and information regarding at least one communication transmitted or received via a second, different SIM card.

Because the SIM-separated user interface paradigm effectively presents the user with different lines of communication, it is sometimes called a "line-centric" user interface. On the other hand, the SIM-aggregated user interface paradigm can transparently blend different lines of communication and group information based on a person or contact number. Therefore, the SIM-aggregated user interface paradigm is sometimes called a "people-centric" user interface.

Users can avail themselves of the user interface paradigm they prefer. For example, a line-centric user may value the boundary between two lines and possibly makes use of the lines for different situations (e.g., work vs. personal or domestic vs. international). A people-centric user may communicate with the same set of individuals over both lines and may draw no strong distinction between two lines, simply choosing the best option according to circumstances.

A user interface can contain both SIM-separated user interface paradigm elements and SIM-aggregated user interface paradigm elements. For example, some types of communications can be aggregated while others are separated.

Example 4

Exemplary SIM-Aggregated Versions of User Interface Elements

In any of the examples herein, a variety of SIM-aggregated versions of user interface elements can be presented in a user interface implementing a SIM-aggregated user interface paradigm. Although some examples are listed in Table 1, below, others can be implemented by aggregating lists, messages, indications, or other information or functionality across a plurality of SIMs.

TABLE 1

SIM-Aggregated Versions of User Interface Elements

| UI Element | SIM-separated version | SIM-aggregated version |
|---|---|---|
| Call history | Listed calls are limited to those for a single SIM | Listed calls comprise a call from one SIM and a call from another SIM (e.g., calls for multiple SIMs are combined into a single list) |
| Conversation list | Listed conversations are limited to those for a single SIM | Listed conversations comprise a conversation from one SIM and a conversation from another SIM (e.g., conversations for multiple SIMs are combined into a single list) |

TABLE 1-continued

SIM-Aggregated Versions of User Interface Elements

| UI Element | SIM-separated version | SIM-aggregated version |
|---|---|---|
| Conversation | Messages are limited to those for a single SIM | A conversation can comprise a message from one SIM and a message from another SIM (e.g., messages are combined into a single list) |
| Outbound Call initiation | Separate call initiation elements are displayed for respective SIMs | Navigation to a SIM-aggregated user interface is accomplished by a single element displayed for initiating a call. A single element can be used for multiple SIMs. A single element can start call initiation, and the SIM that is used can be controlled with another element |
| Message initiation | Separate message initiation elements are displayed for respective SIMs | Navigation to a SIM-aggregated user interface (e.g., conversation list) is accomplished by a single element displayed for initiating a message. A single element can be used for multiple SIMs. A single element can start call initiation, and the SIM that is used can be controlled with another element |
| Missed calls indication | Separate indications (e.g., numbers showing quantities) are shown for respective SIMs | A single indication (e.g., number) is shown for a plurality of SIMs (e.g., the numbers are added together) |
| New voice messages indication | Separate indications (e.g., numbers showing quantities) are shown for respective SIMs | A single indication (e.g., number) is shown for a plurality of SIMs (e.g., the numbers are added together) |
| Unread text messages indication | Separate indications (e.g., numbers showing quantities) are shown for respective SIMs | A single indication (e.g., number) is shown for a plurality of SIMs (e.g., the numbers are added together) |
| List of contacts (e.g., address book) | Separate address books limited to contacts for a particular SIM card are shown. | A combined address book with contacts from more than one SIM card are shown |

Example 5

Exemplary User Interface Paradigm Preferences

In any of the examples herein, one or more stored user interface paradigm preferences can be implemented. Such a preference can indicate whether a user wishes to configure user interfaces for SIM-separated or SIM-aggregated scenarios. To assist in understanding the preference, it can be displayed with a friendly name such as "link," "aggregate," "merge," or the like. Separate stored preferences can be implemented for different communications types (e.g., a preference for calls and a preference for messaging).

The user interface paradigm can be changed according to the stored paradigm preference. In this way, a same user interface type can be presented according to two different user interface paradigms at different times (e.g., on the same device, depending on the preferences). As described herein, factors other than user preference can be taken into account.

An indication of the paradigm preference can be received from a settings user interface or during one of the user interface types described herein (e.g., a call history or conversation list user interface).

Example 6

Figure 2:
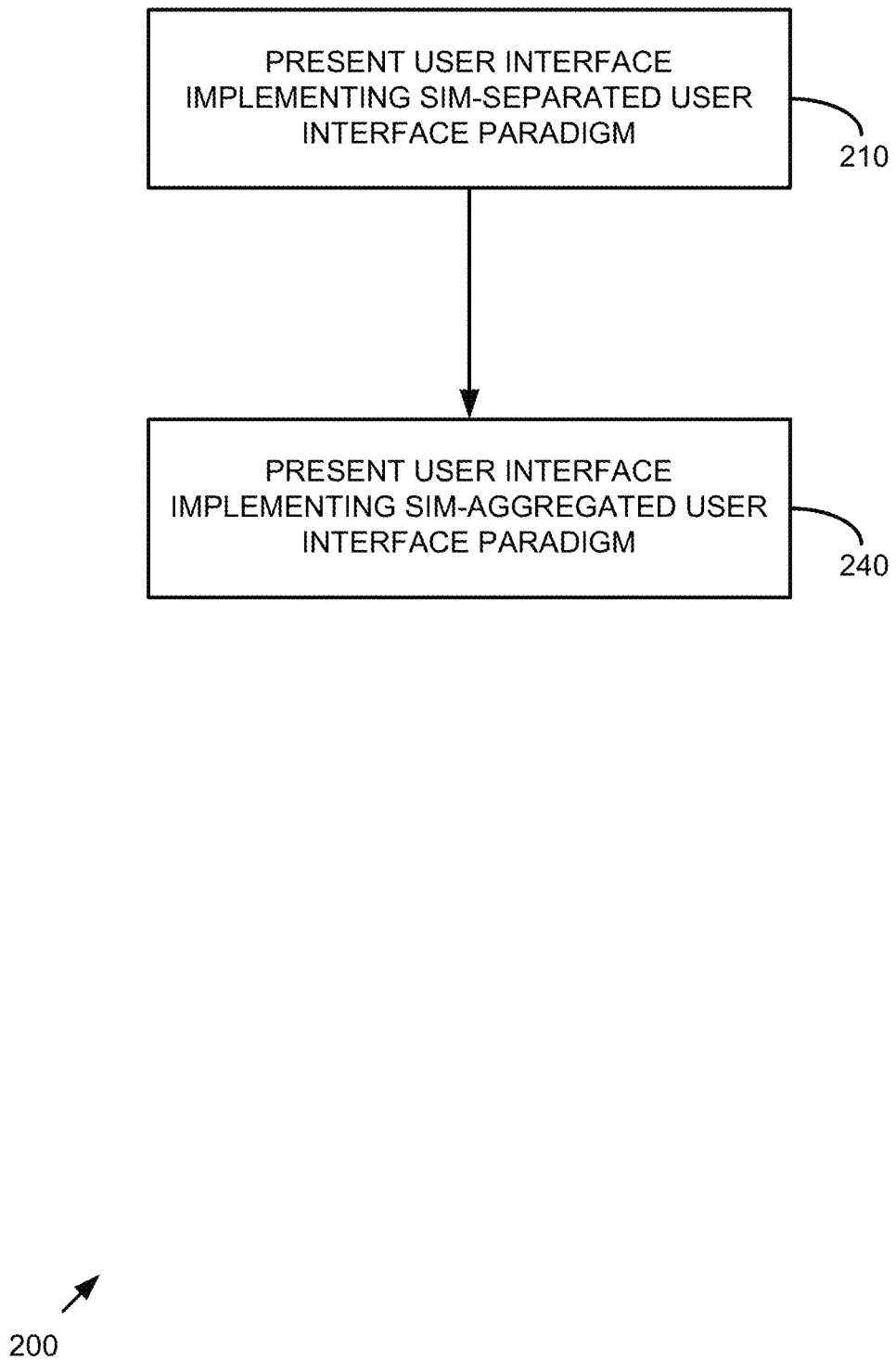
FIG. 2 is a flowchart of an exemplary method of presenting different user interface paradigms for interacting with multiple SIM cards.

Exemplary Method Presenting Different User Interface Paradigms for Multiple SIM Cards FIG. 2 is a flowchart of an exemplary method 200 of presenting different user interface paradigms for interacting with multiple SIM cards and can be implemented, for example, in the system shown in FIG. 1 As with the other methods described herein, the order of the acts can be immaterial (e.g., they can be reversed or the like).

At 210, a first user interface implementing a SIM-separated user interface paradigm is presented. The first user interface can be any of a variety of user interface types described herein.

At 240, a second user interface implementing a SIM-aggregated user interface paradigm is presented. Although direct navigation for the first user interface to the second user interface can be supported, additional user interfaces can be presented between the two user interfaces. The first user interface and the second user interface can be of the same user interface type. Or, two different user interface types can be presented.

User input can be received via the user interfaces, and responsive to the input, navigation to another user interface can be accomplished, or one or more communications actions can be performed via an appropriate SIM.

As described herein, any number of factors can be taken into account when choosing which paradigm to present. For example, choosing the user interface paradigm can be based at least on a stored user interface paradigm preference, a user interface type being displayed, and the like. As described herein, some user interface types can be presented according to a particular paradigm, even when the user preference indicates a different paradigm.

A user interface can morph from one user interface paradigm to another under certain circumstances as described herein. A hybrid user interface can implement both a SIM-separated and a SIM-aggregated paradigm.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 7

Exemplary User Interface Paradigm Selection

Figure 3:
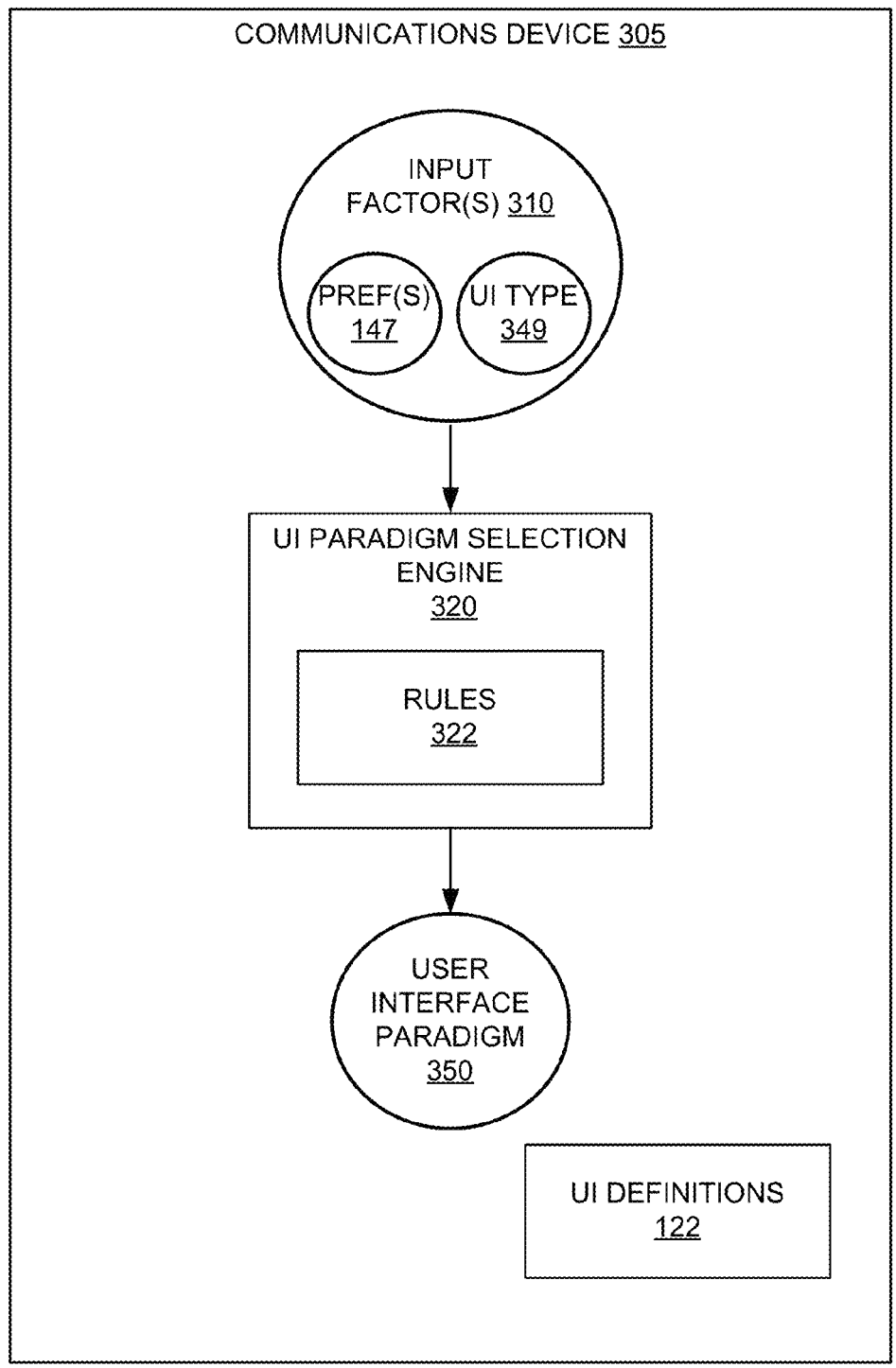
FIG. 3 is block diagram showing an exemplary system implementing a user interface paradigm selection engine to choose a user interface paradigm.

FIG. 3 is block diagram showing an exemplary system 300 implementing a user interface paradigm selection engine to choose a user interface paradigm. In the example, a communications device 305 (e.g., communications device 110 of FIG. 1) comprises a user interface paradigm selection engine 320 that accepts one or more input factors 310 and applies rules 322 to choose a user interface paradigm 350. The engine 320 can support a SIM-separated user interface paradigm and a SIM-aggregated user interface paradigm.

As described herein, the input factors 310 can comprise one or more user interface paradigm preferences 147 a type of user interface 349 being displayed, or the like. In practice, the selected user interface paradigm 350 can comprise a reference to one of the user interface definitions 122 (e.g., as described in FIG. 1), which is then used to present a user interface according to selected user interface paradigm.

The engine 320 can then select an appropriate paradigm 350 via application of the rules 322 as described herein.

Figure 4:
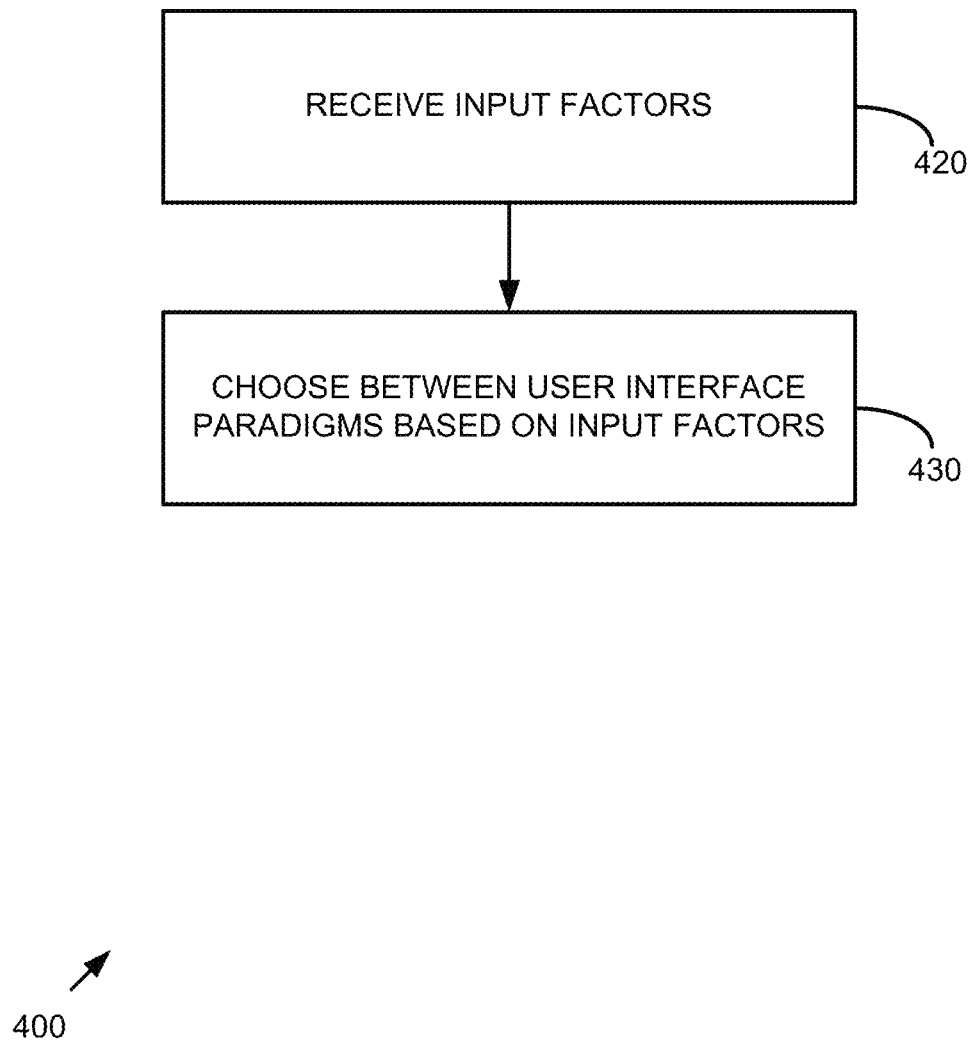
FIG. 4 is a flowchart of an exemplary method of choosing a user interface paradigm based on input factors.

FIG. 4 is a flowchart of an exemplary method 400 of choosing a user interface paradigm based on input factors and can be implemented, for example, in the system shown in FIG. 3.

At 420, one or more input factors as described herein are received.

At 430, a user interface paradigm is chosen based on the input factors.

In practice, a user interface implementing the chosen user interface paradigm is then displayed on a display. Any of the user interface types or features described herein can be implemented accordingly.

Example 8

Exemplary Input Factors, Rules, and Paradigm Selection

Input factors for choosing between the user interface paradigms described herein can take any of a variety of forms. For example, user preferences, such as one or more user interface paradigm preferences operable to indicate either a SIM-separated user interface paradigm or a SIM-aggregated user interface paradigm can serve as input factors. The user interface type being displayed (e.g., of any of the user interface types described herein) can serve as an input factor 310.

The selection rules can support a wide variety of scenarios and provide intelligent selection of a user interface paradigm. For example, a user's preferences can be respected, and different preferences for different user interface types can be supported (e.g., one for calls, and one for messages).

In addition, it may be desirable to override a user's preferences in certain circumstances. For example, when presenting a conversation user interface, a SIM-aggregated user interface paradigm can be presented, even when the paradigm preference indicates a SIM-separated paradigm. The same can be true for an address book (e.g., to present contacts for two SIMs in an aggregated user interface). The rules can be configured as desired to implement desired behavior with respect to user interface paradigm selection.

A rule can be implemented in conjunction with a table as shown in Table 2, below, to determine which user interface paradigm to display. The table can be stored in memory and be consulted when displaying user interfaces. In practice, the user interface type can be stored as a user interface type identifier. The user interface paradigm can be stored as an identifier, with a special identifier used to indicate "according to user preference." Or, the user interface paradigm identifier can be updated when the preference is changed. The rule can choose the user interface paradigm according to the table. In the example, a conversation user interface is presented according to the SIM-aggregated user interface paradigm, regardless of user preference. Other arrangements are possible (e.g., address book is aggregated regardless of user preference). User preferences can be set globally or according to user interface type.

TABLE 2

Table for use with Rule to Determine User Interface Paradigm

| UI Type | UI Paradigm |
| --- | --- |
| Call history | According to user preference |
| Conversation | SIM-aggregated |
| Conversations | According to user preference |
| Summary | |

Example 9

Exemplary Activation

In any of the examples herein, an activatable user interface element can take the form of a displayed or implied user interface element that can be activated by a user. Such elements can take the form of tiles, buttons, areas, items in a list, shapes, sliders, or the like presented as part of a graphical user interface. The user interface element can include text or an icon to indicate functionality.

An activation (e.g., of an activatable user interface element) can take the form of user input indicative of selection (e.g., of the activatable user interface element). For example, in systems supporting touch, a tap, hover, or other touch gesture can be received. Other systems can support clicking, hovering, voice activation, blinking, winking, and the like.

Example 10

Exemplary Contact Points

In any of the examples herein, various number types can be supported (e.g., home, mobile, work, or the like). A contact point can take the form of a contact or a number associated with a contact. For example, a contact point can be a phone number or user address for a contact, such as a work number for a contact, a mobile number for a contact, or a home number for a contact. As described herein, being able to differentiate between different contact points for a single contact can be helpful when engaging in communications (e.g., to use a work SIM to call a contact on their work number).

Example 11

Exemplary Communications

In any of the examples herein, supported communication types can comprise calling, messaging, or the like. A call can be a voice call, video call, or the like. Messaging can take the form of text messaging, SMS messaging, MMS messaging, OTT messaging, or the like and can also support extended content (e.g., audio, video, image, or the like).

Engaging in such communication can comprise placing or receiving a call, sending or displaying a text message, or the like. Numbers can include telephone numbers or other codes used to place a call. User addresses can include social network addresses or other codes used to send a message.

Example 12

Exemplary SIM Cards

In any of the examples herein, a SIM (subscriber identity module) card (or simply "SIM") can take the form of any size SIM card (e.g., mini-SIM, micro-SIM, full-sized, or the like). Such cards are typically used in cell phones that operate on a global system for mobile communications (GSM) network. However, other communications devices (e.g., tablets, hybrids, or the like) and other networks can be supported.

Although the term "SIM" is used, such language is intended to include universal integrated circuit cards (UICCs), virtual SIM cards, removable user identity cards (R-UIMs), or any other hardware or software that can be used to provide a separate identity on a communications device. For example, such an identity can be identified by an international mobile subscriber identity (IMSI) or the like. CDMA implementations can also be supported, including a hybrid CDMA/GSM implementation.

Example 13

Exemplary Non-SIM Implementations

In any of the examples herein, the technologies described as directed to SIM cards can equally be applied to other scenarios providing separate communications lines, such as voice over internet protocol (VOIP), social network communications, or the like. In such a case, line-aggregated and line-separated user interface paradigms can be supported, where a line is defined as one or more SIM cards, one or more non-SIM lines, or both. A mixed environment can be supported. For example, a SIM card can be aggregated with a VOIP user name or the like. Multiple VOIP lines (e.g., home, work, or the like) can be supported. In such implementations, a user name, user address, or the like can be used in place of a phone number. A carrier in such an implementation can be a service or line provider.

Example 14

Exemplary Multiple SIM Cards

In any of the examples herein, the technologies can support multiple SIM cards. For the sake of convenience, sometimes the term "dual SIM" is used, and two SIM cards are shown. However, multiple SIM cards (i.e., a plurality or any number more than one) can be supported. Some SIM cards support a wider variety of features than others. The technologies herein can support SIM cards with differing functionality.

Example 15

Exemplary SIM Card Labels

In any of the examples herein, a SIM card label can take the form of a text string, number, color, or other indication that identifies a particular SIM card out of a plurality of SIM cards. For example, a simple default SIM card label can be a number (e.g., "1," "2," etc.) or a letter (e.g., "C" for CDMA, "G" for GSM, etc.). A carrier name (e.g., "T-Mobile," "AT&T," or the like) associated with the SIM can be used in place of or in addition to the number.

Friendly names (e.g., "home," "work," etc.) can be supported as labels to help a user easily recognize which SIM card is which.

When a plurality of SIM card labels are displayed, they can indicate different SIM cards installed in the communications device. In some cases, it may be desirable to use two labels to indicate a SIM card in a single user interface element. For example, both a single-digit number (e.g., "1") and a carrier name (e.g., "Carrier X") or a friendly name (e.g., "Home") can be presented in a single user interface element.

Example 16

Exemplary Color Indications

In any of the examples herein, SIM cards can be configured to be associated with a color. As a result, user interface elements associated with SIM cards can be depicted in the color associated with the respective SIM card. Color selection can be accomplished as described herein by user preference, system selection, or the like.

Example 17

Exemplary User Interface Types

In any of the examples herein, a user interface type can take the form of any of a wide variety of user interfaces used in communication scenarios for presenting information, collecting information, or both. Such user interface types can include a home screen, call history, recent calls, contact card (e.g., profile), conversation list (e.g., conversations summary, threads, etc.), conversation, lock screen, address book, call-in-progress, incoming call, keypad, and the like.

As described herein, the same user interface type can be presented as implementing a SIM-separated user interface paradigm or as implementing a SIM-separated user interface paradigm, depending on various factors. In some cases, a user interface type can be presented as implementing some, all, or none of its elements according to one or the other paradigm, depending on various factors.

Example 18

Overview of Exemplary Navigation Relationships

Figure 5:
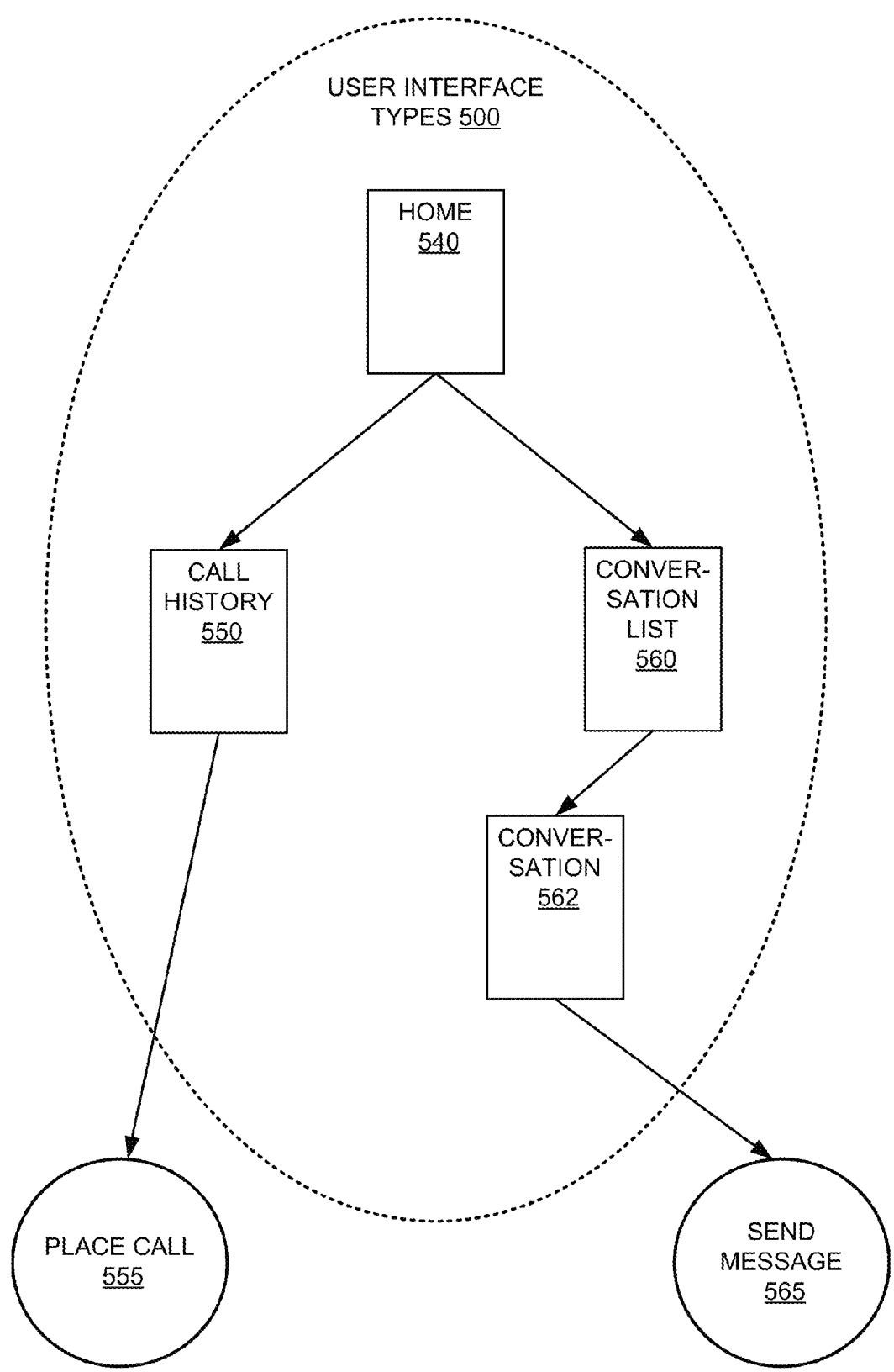
FIG. 5 is a block diagram showing an overview of exemplary navigation relationships between exemplary user interface types used in various communications scenarios.

FIG. 5 is a block diagram showing an overview of exemplary navigation relationships between exemplary user interface types 500 used in various communications scenarios supported by the examples herein.

From a home user interface 540, the device can navigate to a call history 550, conversation list 560, or others (e.g., responsive to activation of a user interface element on the home user interface 540).

From the conversation list user interface 560, navigation to a conversation user interface 562 can be supported (e.g., responsive to activation of a user interface element on the conversation list user interface 560).

As a result of activation of a user interface element in the call history user interface 550, a call can be placed at 555. So, the call history user interface 550 is sometimes called a "call initiation" or "call entry" user interface.

As a result of activation of a user interface element in the conversation user interface 562, a message can be sent at 565. So, the conversation list user interface 560 is sometimes called the "message initiation" or "message entry" user interface. Messages are actually sent from within the conversation user interface 562.

Although orderly navigation is depicted in the example, in practice, navigation in different directions and navigation directly to a desired user interface type can be supported for convenience of the user. For example, if a notification is shown regarding an incoming message, activation of the notification can navigate directly to the conversation 562 user interface without presenting the conversation list 560 user interface.

Additional user interfaces can be supported. For example, a contact card user interface can be implemented that can be reached from a call history or a conversation. Such a contact card user interface can be used to initiate calls.

Example 19

Exemplary Home User Interface

In any of the examples herein, a home user interface can be supported. Such a user interface can present a wide variety of possible functionality via different user interface elements and is typically presented responsive to receiving an indication that a home interface is to be presented (e.g., by activating a home button or the like). For example, different tiles, icons, or the like can be presented by which a user can access communications functions.

Figure 6:
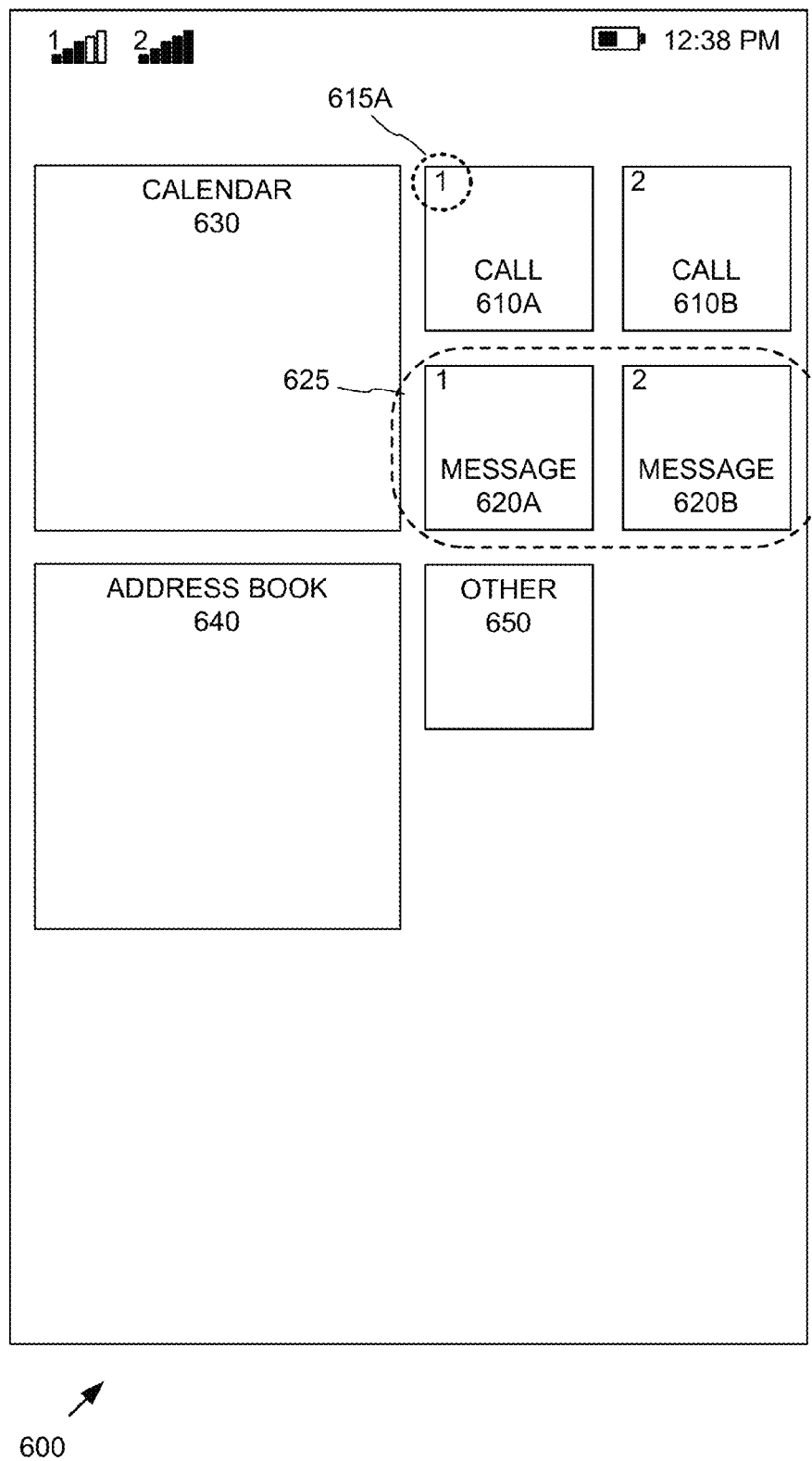
FIG. 6 is a wire frame of an exemplary home user interface implementing a SIM-separated user interface paradigm.

FIG. 6 is a wire frame of an exemplary home user interface 600 implementing a SIM-separated user interface paradigm. In the example, the home user interface presents a SIM-separated user interface paradigm for the call initiation user interface elements 610A and 610B, which are associated with respective SIM cards. Responsive to activation of an element 610A, a user interface from which a call can be placed (e.g., call history user interface) implementing a SIM-separated user interface paradigm for the respective associated SIM card is presented. Because the elements 610A and 610B can be used to initiate calls, they are sometimes called "call entry" user interface elements. As shown, the user interface elements 610A and 610B can be implemented as tiles.

Similarly, the message initiation user interface elements 620A and 620B can be associated with respective SIM cards and are presented according to a SIM-separated user interface paradigm. Responsive to activation of one of the elements 625, a conversation list user interface implementing a SIM-separated user interface paradigm for the respective associated SIM card is presented.

To assist in differentiation between the user interface elements 610A, 610B, 620A, 620B, they can be depicted in a color associated with the represented SIM card. So, the one or more user interface elements 610A, 620A for initiating communication via a first SIM can be depicted in a color associated with the first SIM card (e.g., SIM 1), and the one or more user interface elements 610B, 620B for initiating communication via a second SIM card can be depicted in a color associate associated with the second SIM card.

A distinctive icon associated with call communications can be depicted with (e.g., within) the call elements 610A, 610B (e.g., a handset, telephone, voice icon, or the like), and a distinctive icon associated with message communications can be used on (e.g., depicted within) the message elements 620A, 620B (e.g., a message balloon, emoticon, or the like).

In addition or alternatively, one or more SIM card labels 615A as described herein can be included on the interface elements 610A, 610B, 620A, 620B.

Information related to the activatable functionality can be presented in the user interface elements 610A, 610B, 620A, 620B according to a SIM-separated user interface paradigm. For example, in a call element 610A, 610B, an indication or number of missed calls for the associated SIM card can be shown. Similarly, an indication or number of new voicemail messages can be shown. In a message element 620A, 620B, an indication or number of unread messages for the associated SIM card can be shown.

In practice, a variety of other user interface elements for accessing additional features, such as a calendar 630, address book 640, and others 650 can be presented as part of the home user interface 600.

Figure 7:
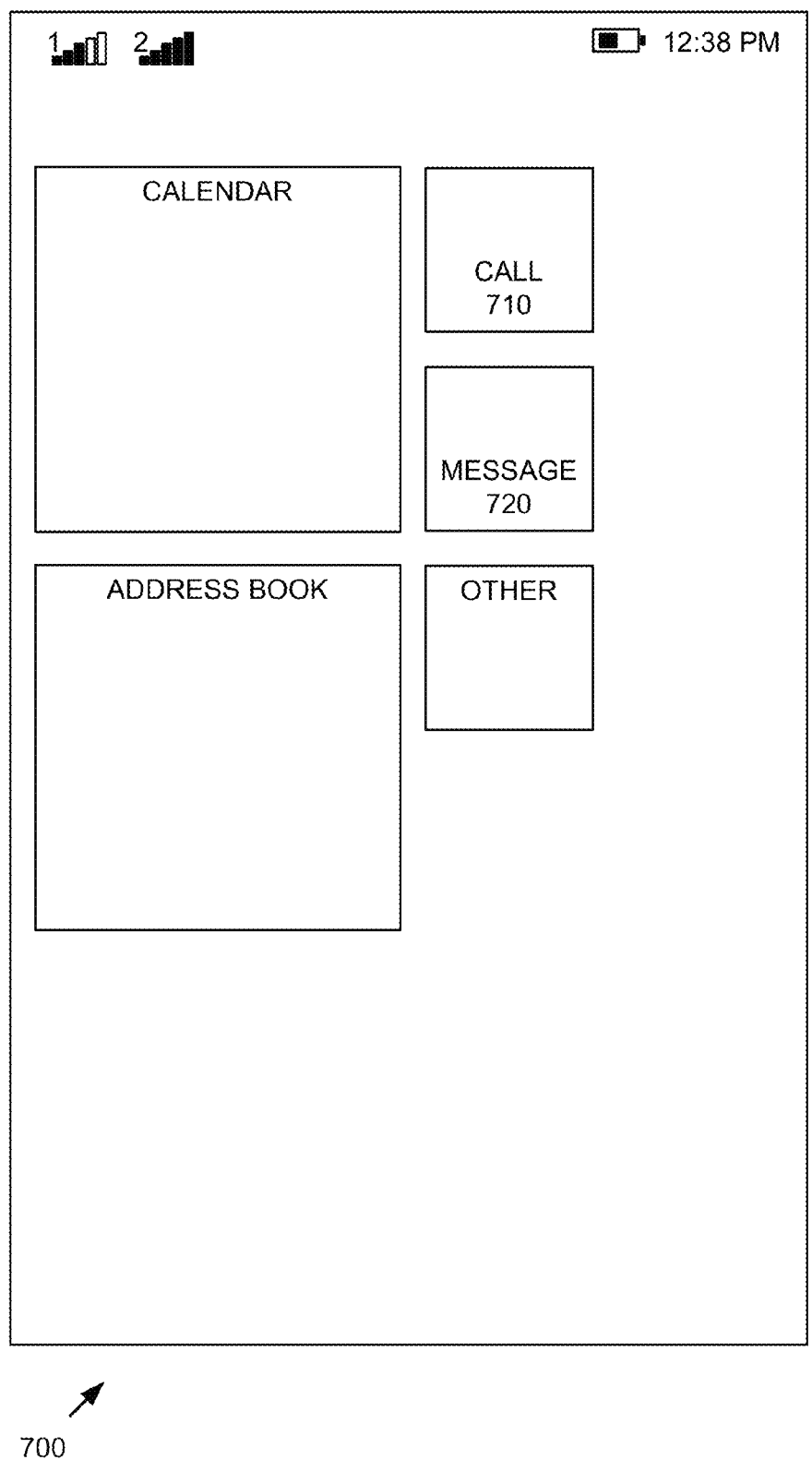
FIG. 7 is a wire frame of an exemplary home user interface implementing a SIM-aggregated user interface paradigm.

FIG. 7 is a wire frame of an exemplary home user interface 700 implementing a SIM-aggregated user interface paradigm. The user interface 700 can be similar to that shown for FIG. 6, except that only a single user interface element 710 is shown for initiating a call, even though there are multiple SIM cards active in the phone (e.g., the user interface elements 610A, 610B for initiating a call have been collapsed into a single user interface element 710). Thus, a single user interface element represents a plurality of SIM cards. Activating the user interface element 710 initiates communications without explicitly specifying a SIM card.

Responsive to activation of the call element 710, a call history user interface implementing a SIM-aggregated user interface paradigm for a plurality of SIM cards is presented. Such aggregated SIM cards or their call histories are sometimes said to be "linked."

Similarly, a single message initiation user interface element 720 can be presented for a plurality of SIM cards. Responsive to activation of the message element 720, a conversation list user interface implementing a SIM-aggregated user interface paradigm for the plurality of SIM cards is presented. Again, such SIM cards or their conversation lists are sometimes said to be "linked."

In some cases, a default SIM card will be selected for the aggregated voice or text elements. To assist in determining the functionality of the user interface elements 710, they can be depicted in a color associated with the default SIM card, which may be the same or different for each element. As in FIG. 6, distinctive icons can be used to differentiate call from message. In addition or alternatively, one or more SIM card labels identifying the default SIM can be included on the interface elements 710, 720.

Information related to the activatable functionality can be presented in the user interface elements 710, 720 according to a SIM-aggregated user interface paradigm. For example, in a call element 710, an indication or number of missed voice calls for the SIM cards (e.g., combined for a plurality of SIMS) can be shown. Similarly, an indication or number of new voicemail messages (e.g., combined for a plurality of SIMS) can be shown. In a message element 720, an indication or number of unread messages for the SIM cards (e.g., combined for a plurality of SIMS) can be shown.

Figure 8:
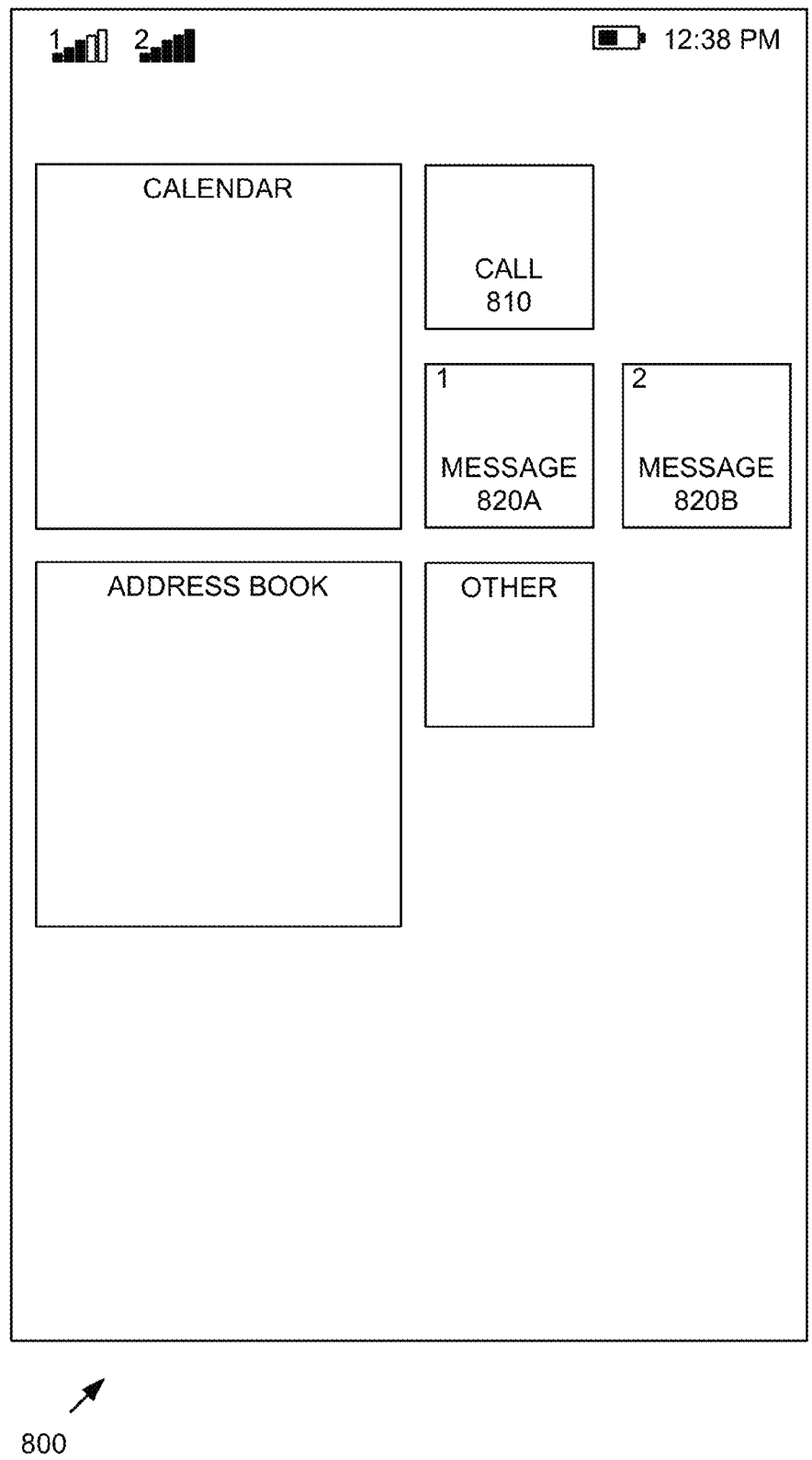
FIG. 8 is a wire frame of an exemplary home user interface implementing a hybrid between SIM-aggregated and SIM-separated user interface paradigms.

In some cases, a hybrid of user interface paradigms can be presented. FIG. 8 is a wire frame of an exemplary home user interface 800 implementing a hybrid between SIM-aggregated and SIM-separated user interface paradigms. The call user interface element 810 can function like the call user interface element 710 of FIG. 7, while the message user interface elements 820A, 820B can function like the message user interface elements 620A, 620B of FIG. 6. Thus, a user interface implementing a SIM-aggregated user interface for calling and a SIM-separated user interface for messaging can be presented as part of the same user interface, or vice versa. In the example, the user interface 800 is configured to aggregate user interface elements for one type of communications (e.g., calls), while displaying separate user interface elements for another type of communications (e.g., messages). A vice versa configuration can easily be supported.

Example 20

Exemplary Separate User Interface Elements

In any of the examples herein, when different user interface elements are displayed according to a SIM-separated scenario, the user interface elements can be resized (e.g., to be different sizes) and moved about the user interface as desired (e.g., placed in different, arbitrary locations in the home user interface). As described herein, the user interface elements can continue to display information distinctive to the associated SIM card (e.g., number of missed calls or the like).

Example 21

Exemplary Signal Strength Depiction

Some user interface elements, such as signal strength, can be presented in any of the user interface types. Such elements can be uniformly depicted separately for different SIMs, regardless of configuration settings. An example is shown in FIG. 6.

Alternatively, a single signal strength meter can be shown (e.g., for a default SIM). Upon the SIM switching functionality described herein, a different signal strength meter (e.g., for the selected SIM card) can be displayed.

Example 22

Exemplary Call History User Interface

Figure 9:
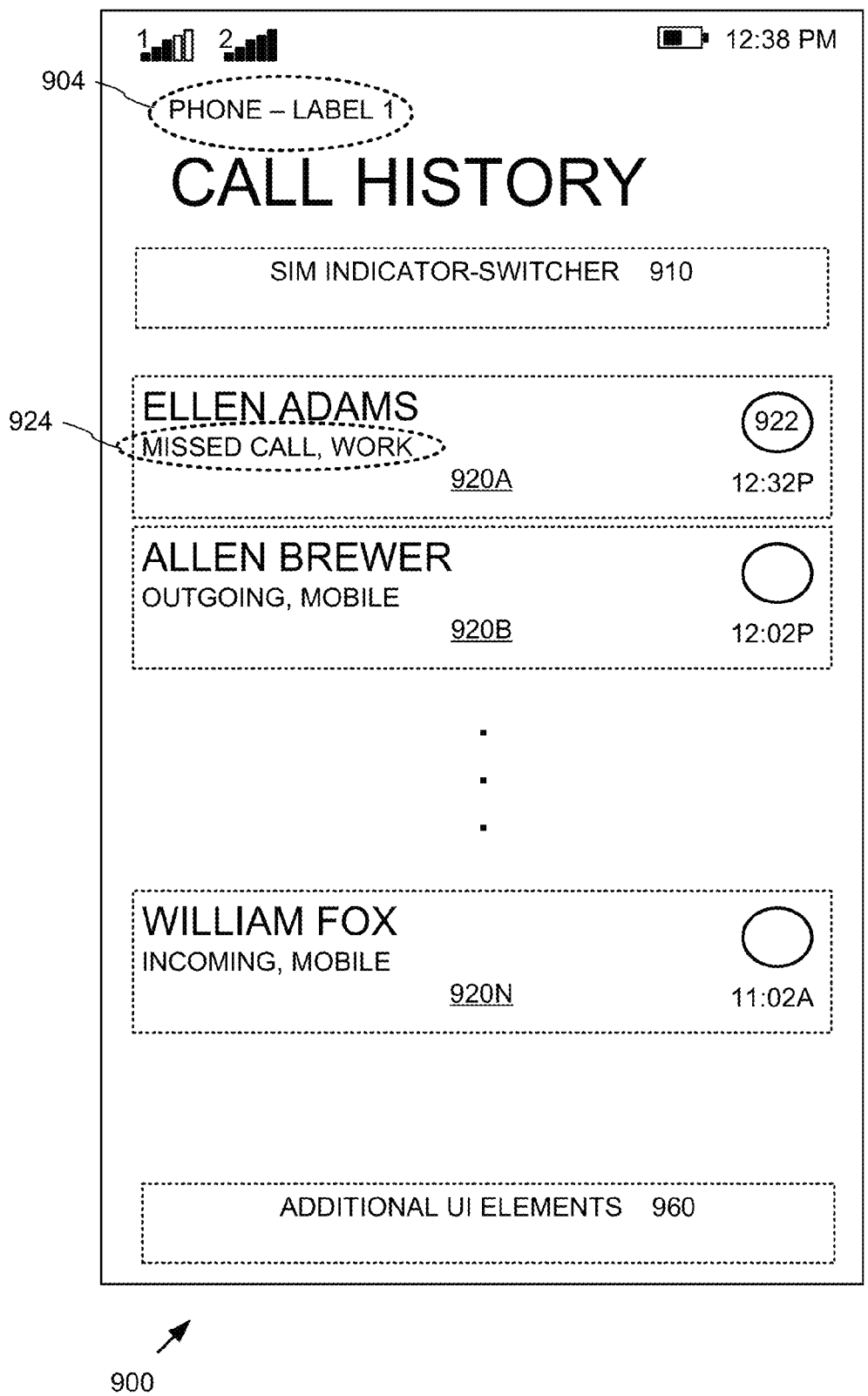
FIG. 9 is a wire frame of an exemplary call history user interface implementing a SIM-separated user interface paradigm.

In any of the examples herein, a call history user interface can be supported. Such a call history can relate to voice calls, video calls, or the like and can be used to engage in communication with the listed contacts. FIG. 9 is a wire frame of an exemplary call history user interface 900 implementing a SIM-separated user interface paradigm. In the example, the list of calls 920A-N are limited to those of a single SIM and are listed in reverse chronological order. A representation of a call 920 can include displayed contact information (e.g., name, communications action type, time, number type, or the like).

As described herein, the user interface 900 can be presented responsive to activation of a user interface element representing the single SIM (e.g., on a home user interface). The single SIM can be indicated via a label 904 that appears in a prominent location, confirming which SIM card was selected by the earlier activation.

As described herein, a SIM indicator-switcher user interface element collection can be presented to assist in switching the SIM card. The indicator-switcher 910 can be customized for the call history (e.g., it can state "return calls using" or the like). Any calls from the user interface 900 can be made with the SIM indicated by the indicator-switcher 910.

Within the list of calls 920A-N, certain special events, such as missed calls 924 can be portrayed in a distinctive color, such as a color associated with the single SIM card.

A call can be placed to the contact point indicated (e.g., the name and number type equate to a number) in the list by activating a user interface element associated with the number. For example, activation of a user interface element 922 or some other location in the representation 920A of the call can be used. A separate depiction of an element 922 from the representation 920A is not necessary. For example, activating the representation 920A of the call can suffice. Alternatively, activation of the representation 920A of the call can navigate to a contact card for the contact person indicated.

Additional user interface elements 960 can be presented. For example, an address book user interface element, a voicemail user interface element, a search user interface element, a keypad user interface element, or the like can be presented. Separately, a user interface element can be provided that links the histories of a plurality of SIM cards. In one implementation, an auxiliary user interface element can be activated that displays a list of lesser used features (e.g., delete all messages, settings, etc.). The list can include a "link histories" command that changes configuration so that the call history of the SIM card is aggregated with the call history of another SIM card. As a result, the call history can be changed to implement a SIM-aggregated user interface paradigm, and the home user interface can collapse two user interface elements into one for initiating calls. For example, the next time tiles are displayed as part of a home screen, only one tile will be shown for multiple (e.g., two) SIM cards. In a SIM-aggregated user interface paradigm, instead of having separate activatable user interface elements per SIM card, an activatable user interface element can represent a plurality of SIM cards.

The configuration can be stored as a setting indicating that SIM-aggregated user interfaces are to be presented for the SIMs (e.g., for calls). As described herein, linking can be performed separately for call communications and message communications.

Before linking takes place, information can be displayed to educate the user regarding the behavior of the linked user interface. The user can be given an option to cancel the linking if desired.

Figure 10:
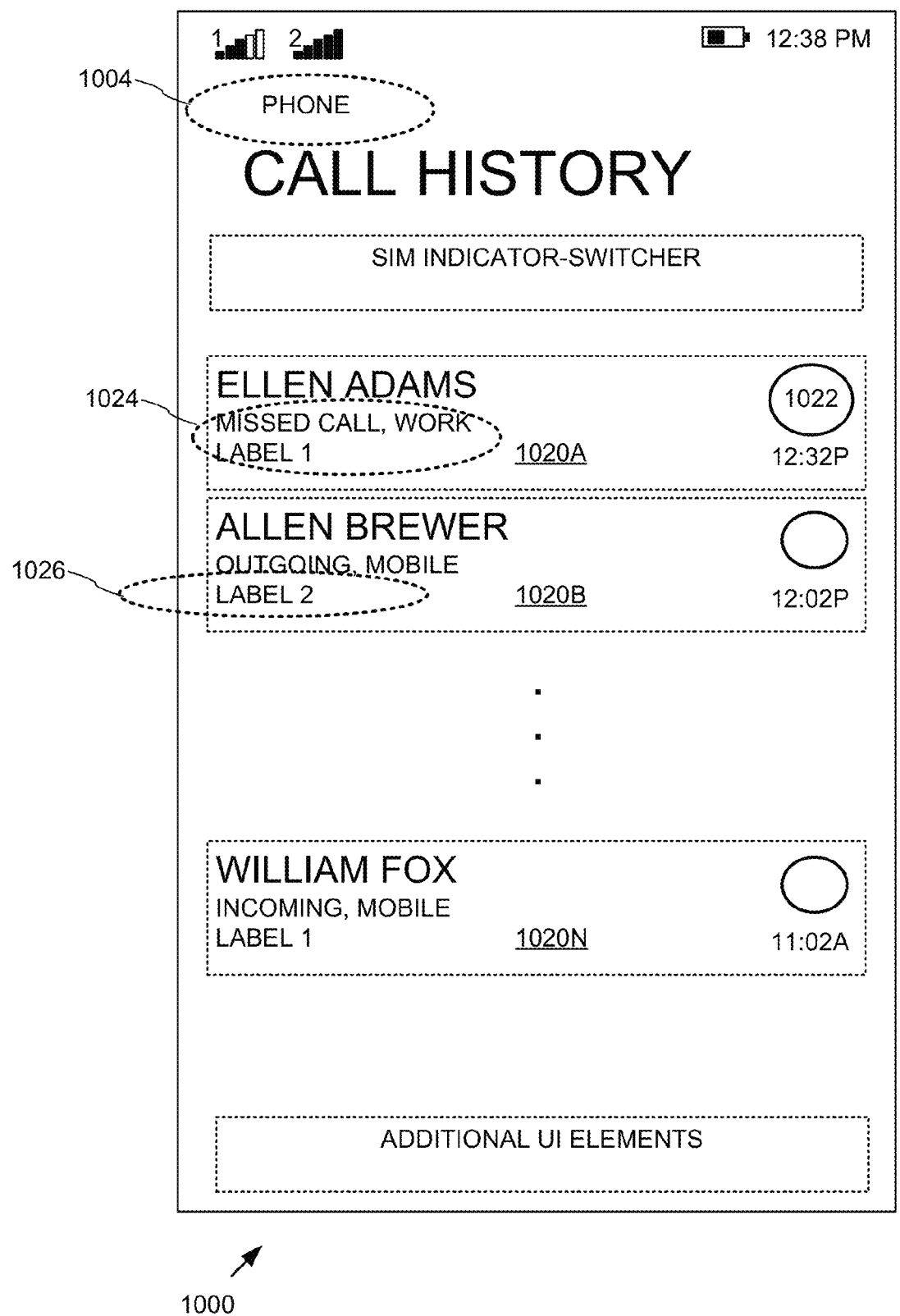
FIG. 10 is a wire frame of an exemplary call history user interface implementing a SIM-aggregated user interface paradigm.

The user interface 900 can also be presented as implementing a SIM-aggregated user interface paradigm. FIG. 10 is a wire frame of an exemplary call history user interface implementing a SIM-aggregated user interface paradigm. Some elements of the user interface can remain the same, but others can be depicted differently in light of the paradigm.

For example, a generic indication 1004 (e.g., "phone") can be used instead of a SIM-specific label. The list of calls 1020A-1020N can comprise at least one call 1020A for a first SIM card and at least one call 1020B from a second SIM card.

Within the list of calls 1020A-N, certain special events, such as missed calls 1024 can be portrayed in a distinctive color, such as a color associated with the SIM card associated with the event (e.g., within the user interface 1000, a different color indicates a different SIM card).

A label 1026 can be included in the representation of the call 1020B to indicate the SIM card for the call.

A call can be initiated in a manner similar to that described for FIG. 9. Calls can be returned using the SIM indicated in the SIM indicator-switcher. The user interface 1000 can be changed to implement a SIM-separated user interface paradigm in a manner similar to that used for linking (e.g., via an unlinking feature).

Example 23

Exemplary Default SIM for Aggregated User Interfaces

In any of the examples herein, for an aggregated user interface, the default SIM can be based on a user preference, the first SIM that was placed in the device, a default slot (e.g., where on the hardware the SIM is inserted), first used SIM, or the like. Such a SIM is sometimes called the "primary" SIM.

The default can also be the SIM last used (e.g., for a given communication type), either globally or for a specific interface type. So, if the last call was on a first SIM, the default for calling can be the first SIM. If the last message was on a second SIM, the default for messaging cam be the second SIM. In some cases, a clear default may not be determined by rules, so the primary SIM can become the default.

The default SIM can also be chosen based on input conditions as described herein.

Example 24

Exemplary Conversation List User Interface

Figure 11:
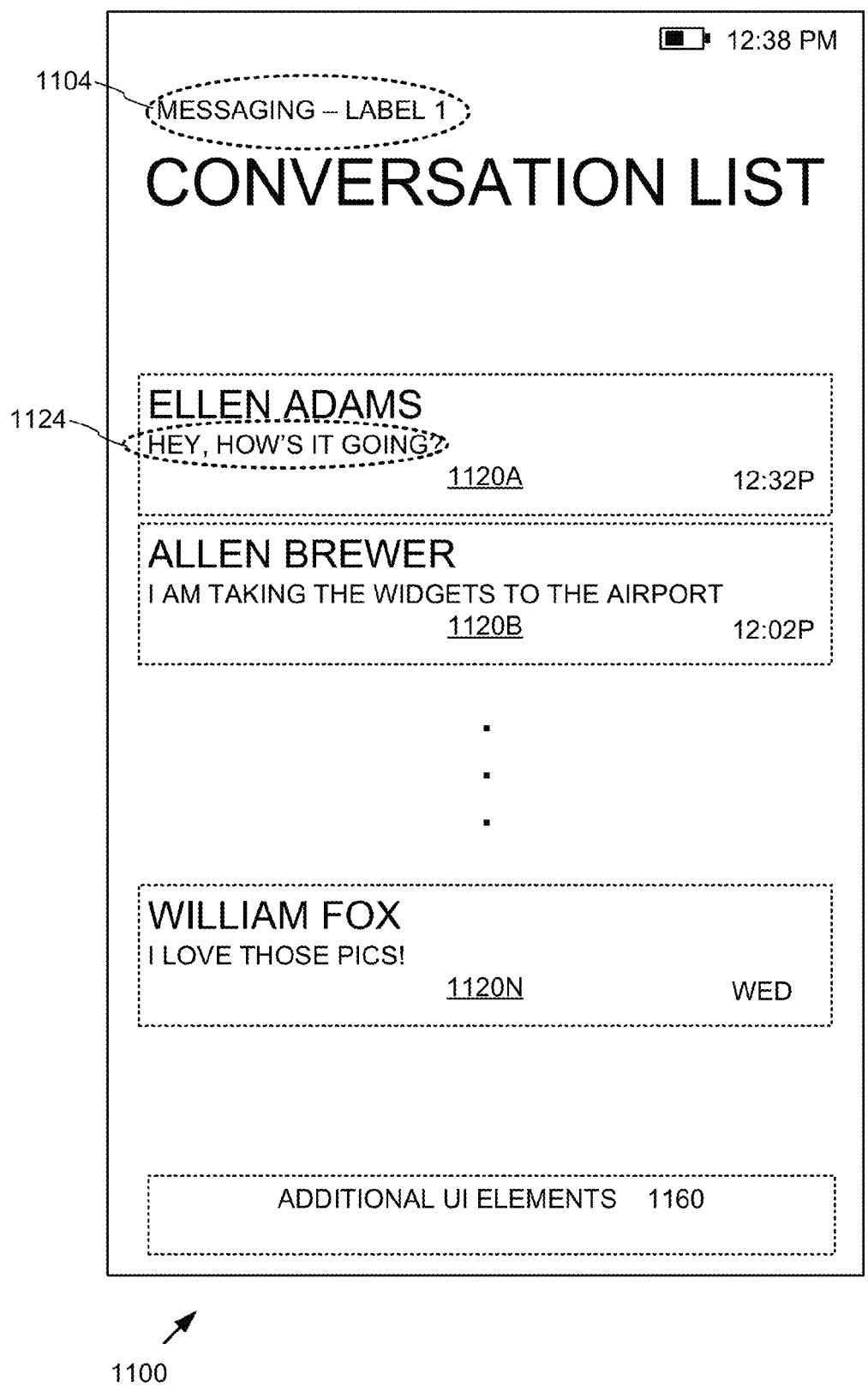
FIG. 11 is a wire frame of an exemplary conversation list user interface implementing a SIM-separated user interface paradigm.

In any of the examples herein, a conversation list user interface can be supported as implementing a SIM-separated or SIM-aggregated user interface paradigm. The conversation list user interface can present a summarizing list of conversations (e.g., messages grouped by contact point or number). Because a conversation can be conceptualized as a string or thread of linked messages that make up a conversation (e.g., with a contact or contact point), the conversation list is sometimes called "threads." FIG. 11 is a wire frame of an exemplary conversation list user interface implementing a SIM-separated user interface paradigm. In the example, the list of conversations 1120A-N are limited to those of a single SIM and are listed in reverse chronological order. As described herein, the user interface 1100 can be presented responsive to activation of a user interface element representing the single SIM (e.g., on a home user interface). The single SIM can be indicated via a label 1104 that appears in a prominent location, confirming which SIM card was selected by the earlier activation.

Within the list of conversations 1120A-N, certain special events, such as unread messages 1124 (e.g., unread in the conversation user interface) can be portrayed in a distinctive color, such as a color associated with the single SIM card.

A message can be initiated to the indicated contact in the list by activating a user interface element associated with the contact. For example, activation of a location in the representation 1120A or a separate user interface element can be used. Other arrangements are possible.

Additional user interface elements 1160 can be presented. For example, a user interface element can be provided that links the conversation list of a plurality of SIM cards. In one implementation, an auxiliary user interface element can be activated that displays a list of lesser used features (e.g., delete all messages, settings, etc.). The list can include a "link conversation list" command that changes configuration so that the conversation list of the SIM card is aggregated with the conversation list of another SIM card. As a result, the conversation list user interface can be changed to implement a SIM-aggregated user interface paradigm, and the home user interface can collapse two user interface elements into one for initiating messages. The configuration can be stored as a setting indicating that SIM-aggregated user interfaces are to be presented for the SIMs (e.g., for messages).

Figure 12:
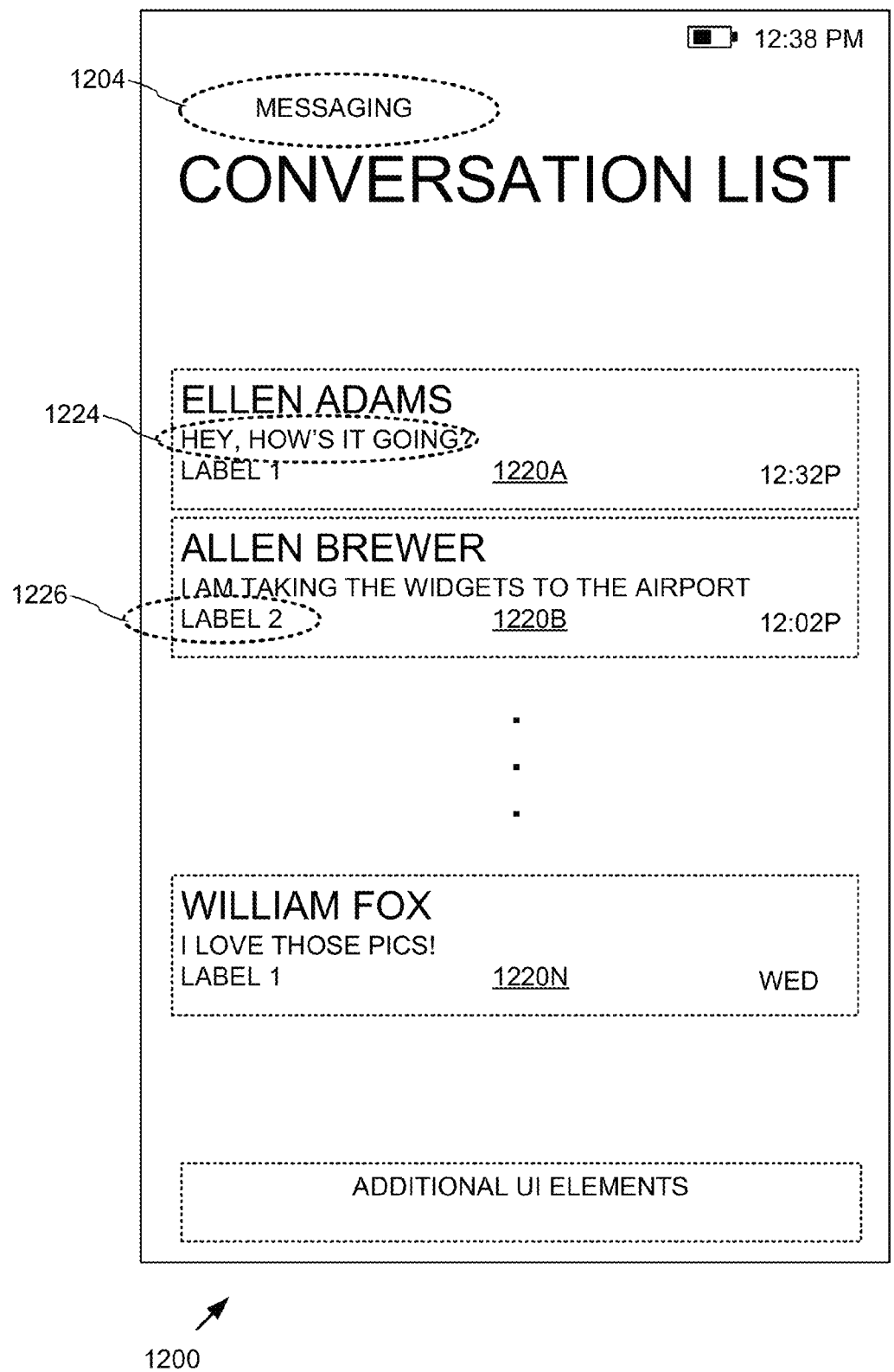
FIG. 12 is a wire frame of an exemplary conversation list user interface implementing a SIM-aggregated user interface paradigm.

The user interface 1100 can alternatively implement a SIM-aggregated user interface paradigm. FIG. 12 is a wire frame of an exemplary conversation list user interface 1200 implementing a SIM-aggregated user interface paradigm. Some elements of the user interface can remain the same, but others can be depicted differently in light of the paradigm.

For example, a generic indication 1204 of messaging can be used instead of a SIM-specific label. The list of conversations 1220A-1220N can comprise at least one message 1220A for a first SIM card in one summarized conversation and at least one message 1220B from a second SIM card in another summarized conversation. The conversations themselves need not be aggregated in the list, but can be.

Within the list of conversations 1220A-N, certain special events, such as unread messages 1224 can be portrayed in a distinctive color, such as a color associated with the SIM card associated with the message (e.g., within the user interface 1000, a different color indicates a different SIM card).

A label 1226 can be included in the representation of the conversation 1220B to indicate the SIM card for the message.

A message can be initiated in a manner similar to that described for FIG. 11. The user interface 1200 can be changed to implement a SIM-separated user interface paradigm in a manner similar to that used for linking (e.g., via an unlinking feature).

Example 25

Exemplary Conversation User Interface

In any of the examples herein, a conversation user interface can be presented. Although only a SIM-aggregated user interface paradigm implementation is shown in the examples, a SIM-segregated implementation is possible and can be controlled by user preferences or other factors as described herein.

The conversation user interface can present a conversation as a thread of messages grouped by contact (e.g., name, number, or the like). As described herein, the conversation user interface can depict an entire conversation, even if it spans multiple SIM cards (e.g., different SIM cards were used for the messages). Thus, a conversation can be shown in a single conversation user interface for messages communicated via plurality of SIM cards.

Figure 13:
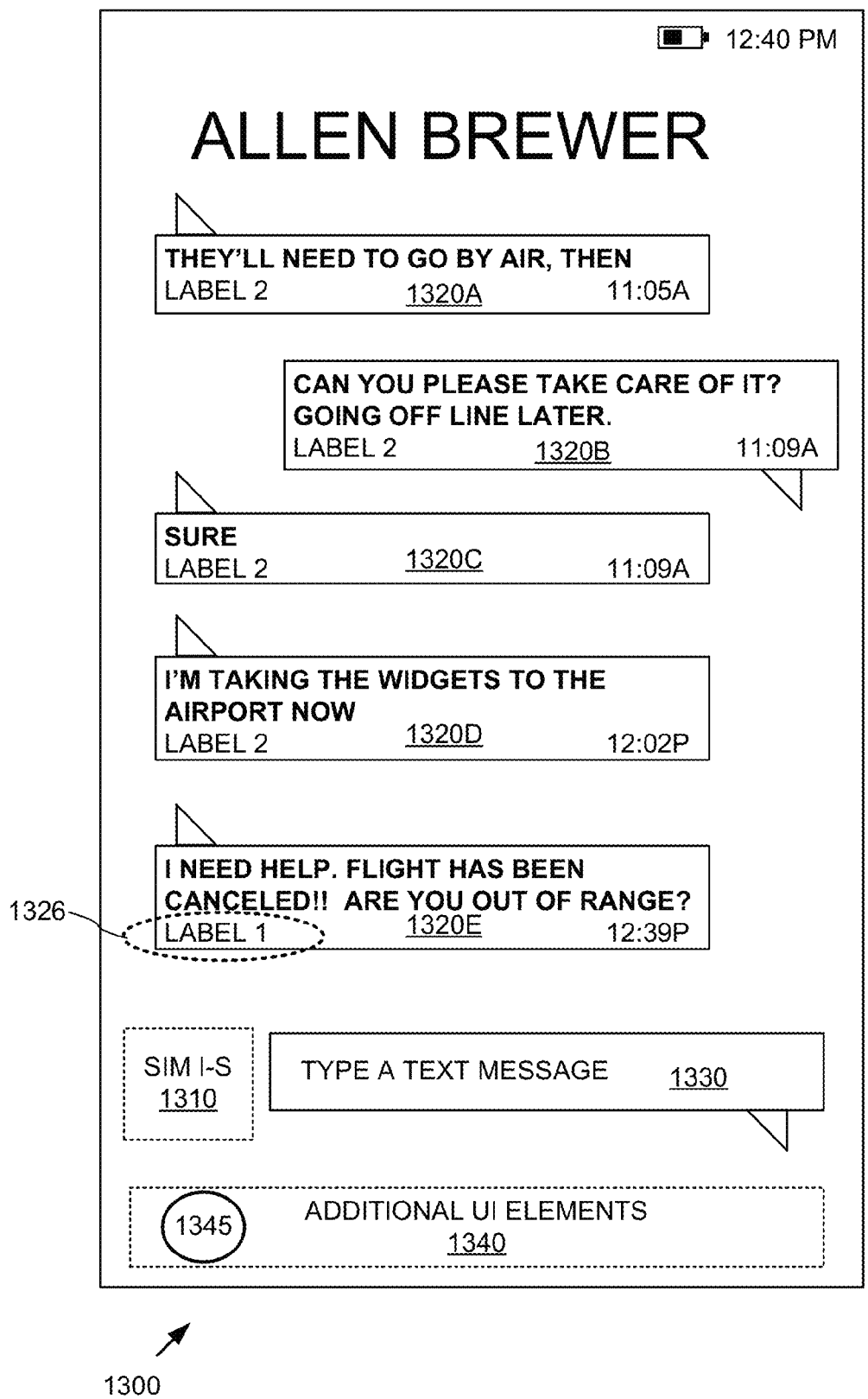
FIG. 13 is a wire frame of an exemplary conversation user interface implementing a SIM-aggregated user interface paradigm.

FIG. 13 is a wire frame of an exemplary conversation user interface 1300 implementing a SIM-aggregated user interface paradigm. In the example, the list of messages 1320A-E are aggregated from a plurality of SIM cards and are listed in chronological order. As described herein, the user interface 1300 can be presented responsive to activation of a user interface element representing the conversation (e.g., in a conversation list user interface). The SIM-aggregated user interface 1300 can be presented regardless of whether the SIM cards are aggregated for other user interfaces (e.g., even if user preferences indicate that SIM-separated user interfaces for messaging are to be presented). Thus, continuity of conversations can be preserved regardless of previously shown user interface paradigms. A separate paradigm preference can indicate whether conversations should be aggregated, regardless of the preference for messaging.

In an aggregated case, the default SIM can be based on a user preference, the first SIM that was placed in the device, a default slot (e.g., where on the hardware the SIM is inserted), first used SIM, or the like. Or, a default independent of a contact point as described herein can be used.

In a SIM-segregated implementation, various techniques can be used to easily convey which line was used for each message. For example, a label indication the single SIM card can be presented as in the other examples. The messages 1320A-E can be presented in colors associated with the respective SIM cards (e.g., a first message can be in a first color, and a second message on a different SIM can be in a second, different color).

A message can be sent to the indicated contact by typing a message in the text message box 1330 and activating a send user interface element 1345. Other user interface elements 1340 can provide additional functionality (e.g., to attach pictures, recordings, or the like). Although not shown, a virtual keyboard can be activated to assist in typing a message.

A SIM card indicator-switcher user interface collection 1310 can both indicate which SIM card will be used to send the message and accept a switch of SIM card. In practice, the interface collection 1310 can be positioned in a different location (e.g., upper right) and may or may not be proximate the text message box 1330. A description of "send using" can be used with the indicator-switcher. If a conversation is proceeding on a single SIM card, a message sent or received from another SIM card causes the user interface to apparently morph from a SIM-separated user interface paradigm to a SIM-aggregated user interface paradigm.

A method of presenting a conversation user interface spanning a plurality of SIM cards can comprise displaying a first message communicated with a first SIM card and displaying a second message communicated with a second SIM card in a same user interface. For example, a message can be received via a receiving SIM other than that used to send a message to the contact. Still, the received message can be displayed as part of the conversation user interface.

Similarly, if a text message is sent using the conversation user interface using a SIM card other than the default SIM card, after the message is sent, the message can be shown as part of the conversation user interface (e.g., as part of the conversation displayed in the user interface).

Example 26

Exemplary Lock Screen User Interface

In any of the examples herein, a lock screen user interface can be supported. Such a user interface can depict information that allows a user to glance at the interface and determine a synopsis of communications status without having to enter an unlock code. Such functionality is sometimes called "above the lock" functionality For example, signal strength, the current date and time, an upcoming appointment, and the like can be shown.

The lock screen can implement a SIM-separated user interface paradigm by presenting missed calls indications, new voice messages indications, unread text messages indications, or the like as separate numbers or indications for separate SIM cards. Such information can be labeled with one or more SIM card labels to indicate with which SIM it is associated.

The lock screen can implement a SIM-aggregated user interface paradigm by presenting a missed calls indication, new voice messages indication, unread text messages indication, or the like as combined numbers or indications. As described herein, calling and text functionality can be separately separated or aggregated. For example, calls can be aggregated, and messaging can be separated or vice versa.

Example 27

Exemplary Other User Interface Types

In the interest of brevity, a full description of other user interface types is not presented. The user interface features described as used in the other user interface types can be used with such user interfaces.

Examples include an incoming call user interface (e.g., that displays a label of the SIM receiving the call), a call-in-progress user interface (e.g., that displays a label of the SIM involved in the call and highlights user interface elements in a color associated with the involved SIM), a keypad user interface (e.g., that displays a SIM indicator-switcher as described herein), an address book (e.g., that can be aggregated or separated), and the like.

A recent calls or recent contacts user interface can function similarly to the call history user interface by listing recent activity. Such a recent calls or recent contacts user interface can be presented as part of an address book.

In an aggregated scenario, user interfaces such as the keypad can use a SIM default as described herein (e.g., for aggregated call history).

A background user interface technique can be used to display calls in the background, a recently received message, new voicemails, or the like. For example, a pop up strip at an edge (e.g., top) of the user interface can be used. One or more SIM card labels can be included in the strip to indicate the SIM involved. The strip can be of a color associated with the SIM card involved.

Example 28

Exemplary SIM Card Switching

In any of the examples herein, the default or current SIM card can be switched to another SIM card. For example, during various of the user interfaces depicted herein, an indication can be received that the default SIM card is to be switched to another, selected SIM card. Responsive to such an indication, communication can be initiated (e.g., to the selected contact) using a SIM card other than the default SIM card (e.g., the selected SIM card).

Example 29

Exemplary SIM Indicator-Switcher User Interface Collection

In any of the examples herein, a SIM indicator-switcher can take the form of a SIM indicator-switcher user interface collection or other mechanism as described herein. As described herein, such a SIM indicator-switcher or other mechanism can appear as part of a call history user interface or the like. The user interface can be presented consistently across SIM-separated and SIM-aggregated user interface paradigms.

Figure 14:
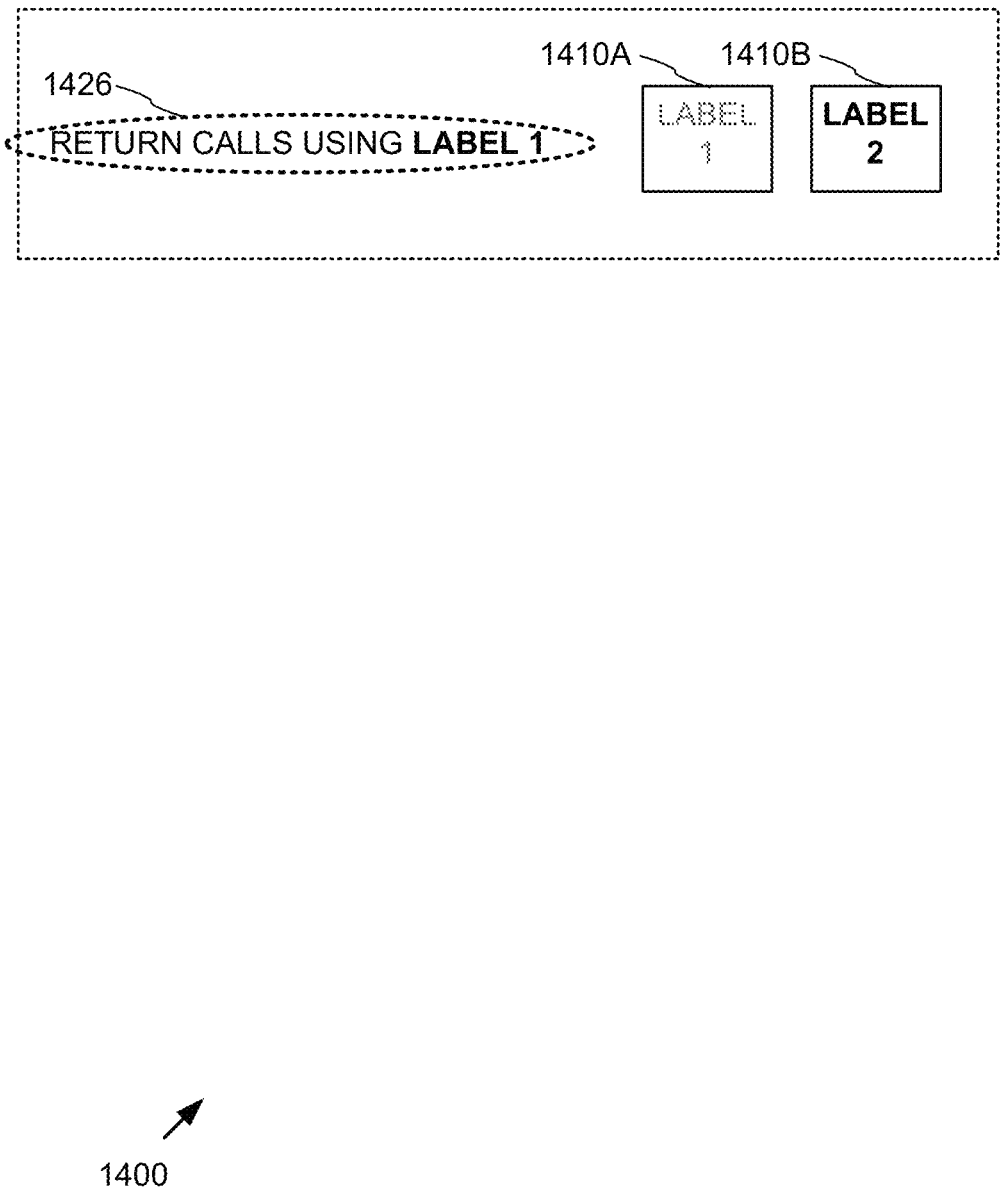
FIG. 14 is a wire frame of an exemplary SIM indicator-switcher user interface collection.

FIG. 14 is a wire frame of an exemplary SIM indicator-switcher user interface collection 1400. The collection can include a plurality of SIM user interface elements 1410A-B for respective of the SIMs supported (e.g., one element per SIM card). For example, a dual SIM implementation can have two SIM user interface elements. The user interface elements can include a label indicating the represented SIM. In one implementation, a simple number (e.g., "1") is used as a label to indicate the SIM. Other short or single-character labels (e.g., "W" for work) are possible.

An additional label with optional description 1426 can also be included. The additional label and description 1426 can customize the collection for a particular use, while maintaining a consistent user interface across the user experience. The label and/or description can be depicted in a color associated with the SIM card associated with the element.

The SIM user interface elements 1410A-B can indicate the current (e.g., default) SIM card (e.g., the SIM card that will be used when engaging in communications) by depicting it distinctly. For example, it can be highlighted, bolded, flashing, or the like. It can also be portrayed in a color associated with the represented SIM card. The one or more user interface elements 1410A for non-current SIM cards can be portrayed plainly. For example, they can be neutral, greyed out, regular, non-flashing, or the like.

Thus, in practice, one of the elements 1410B is depicted distinctly (e.g., in a color associated with the SIM card), and the other(s) 1410A are not (e.g., are greyed out). Switching SIM cards can be accomplished by activating a non-distinct element in the collection.

Activation of a user interface element associated with a non-current SIM card can switch to the selected SIM (e.g., the SIM associated with the activated user interface element). Such an activation can also engage in communications (e.g., to avoid an additional activation). However, in some cases, it may be desirable to wait for an additional activation (e.g., when sending a message). Upon activation of a SIM card, the display can be changed to reflect activation (e.g., the current SIM card is changed).

Example 30

Exemplary SIM Switching Alternatives

In any of the examples herein, SIM switching can be accomplished in a variety of other ways. For example, in any of the user interfaces shown herein, instead of showing a separate SIM indicator-switcher, special activation of listed contacts can be supported. Special activation (e.g., of a contact) results in display of an option to engage in communications using a different SIM (e.g., the SIM is listed as a selectable option).

Special activation can take the form of a tap-and-hold activation (e.g., of a contact). Alternatively, a special user interface element (e.g., chevron) can be displayed (e.g., proximate a contact). Responsive to special activation, a different SIM can be listed as a selectable option, resulting in a SIM card switch.

Other possible techniques include any activation of a displayed list of SIM card labels; an activation of a SIM card label can toggle between or rotate among SIM cards; an activation of a SIM card label can result in a popup list of SIM cards, from which a SIM card can be selected; or the like. Swiping, panning, bumping, shaking, voice commands, and the like can also be used.

Other user interface elements can be used to achieve similar results.

Example 31

Exemplary SIM Card Switching Method

Figure 15:
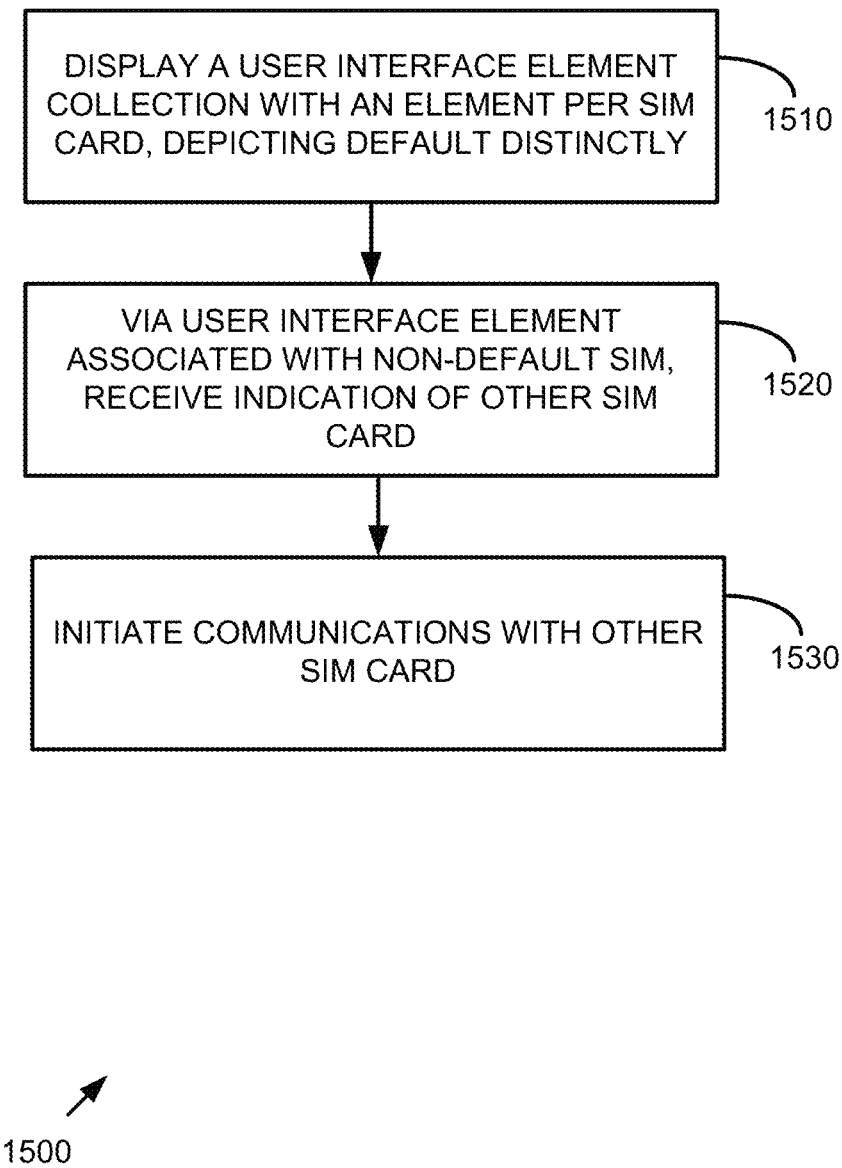
FIG. 15 is a flowchart of an exemplary method of receiving an indication of making a call from a SIM card other than the selected SIM card.

FIG. 15 is a flowchart of an exemplary method 1500 of presenting a user interface for switching SIM cards and can be implemented, for example, via the user interface shown in FIG. 14. Because the user interface of FIG. 14 can be used with a variety of user interface types described herein, the method 1500 can also be employed across a variety of user interface types. For example, both calls and messages can be supported.

At 1510, a user interface element collection (e.g., one per SIM card) is displayed as shown in FIG. 14. The element associated with the default SIM is depicted distinctly.

At 1520, an indication of another SIM card is received via a user interface element associated with a non-default SIM card.

At 1530, communications are initiated with the other SIM card.

An indication that the default SIM card is to be overridden and the selected other SIM card can be achieved via one user interface interaction (e.g., an activation such as a tap). Communications can also be initiated responsive to the activation. Therefore, a single activation can indicate three communication actions.

Example 32

Exemplary SIM Card Import and Export

In any of the examples herein, import and export functionality for multiple SIM cards can be supported. For example, source and destination information can be received, and the contacts to be imported or exported can be indicated. Subsequently, the contacts can be imported from or exported to a SIM card.

Source or destination can be specified by SIM card label, user accounts (e.g., of a user account having contacts associated therewith, etc.), or the like.

In any of the examples herein, the source of the contact (e.g., from which SIM card it originated) can be stored and used subsequently as a default when dealing with the contact.

Example 33

Exemplary SIM Card Defaults

In any of the examples herein, SIM card defaults can be implemented. As described herein, such a default can be chosen based on a variety of input factors. The default can be presented as the currently selected SIM, but a different SIM can be chosen to actually initiate communications as described herein.

SIM card defaults can be set individually to a contact point. For example, the default for a work number can be different from a mobile number. The SIM card defaults can be presented in any of the user interface types described herein. In cases where more than one contact point is presented, a different SIM card can be presented for another contact point in the user interface. For example, a contact card can present an indication of the default SIM card (e.g., on an SIM indicator-switcher) for a contact point. Because a contact card can have two different contact points, it can have two different default SIMs presented. So, each phone number on a contact card can have its own SIM default, which can be an independently chosen and indicated SIM card.

However, when a default is set for a first contact point on a contact, it can be propagated to other contact points for the same contact. For example, if a first call to a given contact is on a first SIM, other numbers for the given contact can default to the first SIM. Subsequent calls to the contact on a different contact point (e.g., work) can then change the default (e.g., if the call is made on a second SIM, the default becomes the second SIM). Thus, independent, per-contact-point default SIM selection can be implemented. So, in the absence of other factors to the contrary, the first SIM used to communicate with a contact can be used as the preferred one for the entire set of numbers for the contact, but such a preference can be easily overridden by future behavior.

The default SIM card can be selected based on any of a number of factors. A contact point can be stamped upon occurrence of certain events.

For example, the default can be selected as the SIM card on which the contact point resides. The contact point can be stamped with the default when the SIM card is inserted.

The default SIM card can be selected as the SIM card from which the contact point was imported. The contact point can be stamped with the default when the contact point is imported.

The default SIM card can be selected as the SIM card most recently involved in communications activity (e.g., answered call, missed call, initiated call, incoming message, outgoing message, or the like) with the contact point. The contact point can be stamped with the default when engaging in such communication.

As described herein, a different SIM card than the default SIM card can be used. For example, the default can be indicated in a SIM indicator-switcher and switched accordingly.

Overriding the default can result in change of the default for subsequent conversations. In some cases, it is possible to override the default without actually engaging in communication (e.g., by selecting another SIM card but not making a call).

Earlier indications of a default (e.g., import) can be overridden by subsequent user communication behavior (e.g., receiving or making calls).

A default SIM can be selected independent of the contact point based on input conditions. Such a default SIM can override a default SIM for a contact point or be used as a default in an aggregated interface scenario. For example, an overriding default SIM can be selected based on whether a SIM card is receiving no signal from the carrier (e.g., whether there is coverage). So, responsive to determining that a SIM card is receiving no signal, another SIM can be selected as the default. The original default can be stored and used subsequently in response to determining that the SIM card is receiving signal again. So, if user behavior implies that a SIM that is currently not working should be selected as default, such a selection can be overridden with a SIM that can communicate. Reasons for a non-working SIM can be that it is not present, there is no (or insufficient) signal, or the like.

Relative signal strength can also override the default SIM (e.g., calls are made using multiple SIMs, and one of the SIMs has a better signal strength that the other).

The physical orientation of a device can also override the default SIM (e.g., flipping a phone to lie flat on one side or the other causes it to select a particular SIM or rotating the phone to have a particular end up can cause it to select a particular SIM).

Stored information about billing arrangements or plans (e.g., supplied by the user or network) can override the default SIM (e.g., calls to international numbers default to the SIM with a better international plan, calls default to a SIM having free nighttime calls during the nighttime period, or the like).

Recognition of a wireless network to which a device is connected can be used to override the default SIM. For example, if it is determined that the device is connecting to a home wireless network, the default SIM can be overridden to be the home SIM.

If do not disturb functionality is invoked, the default SIM can be overridden to be a particular SIM (e.g., the home SIM).

A variety of other factors can be used when determining whether to override the default SIM. For example, time-of-day, roaming indication, physical location, calendar availability (e.g., work appointments or personal appointments are currently indicated), or the like can be used.

Figure 16:
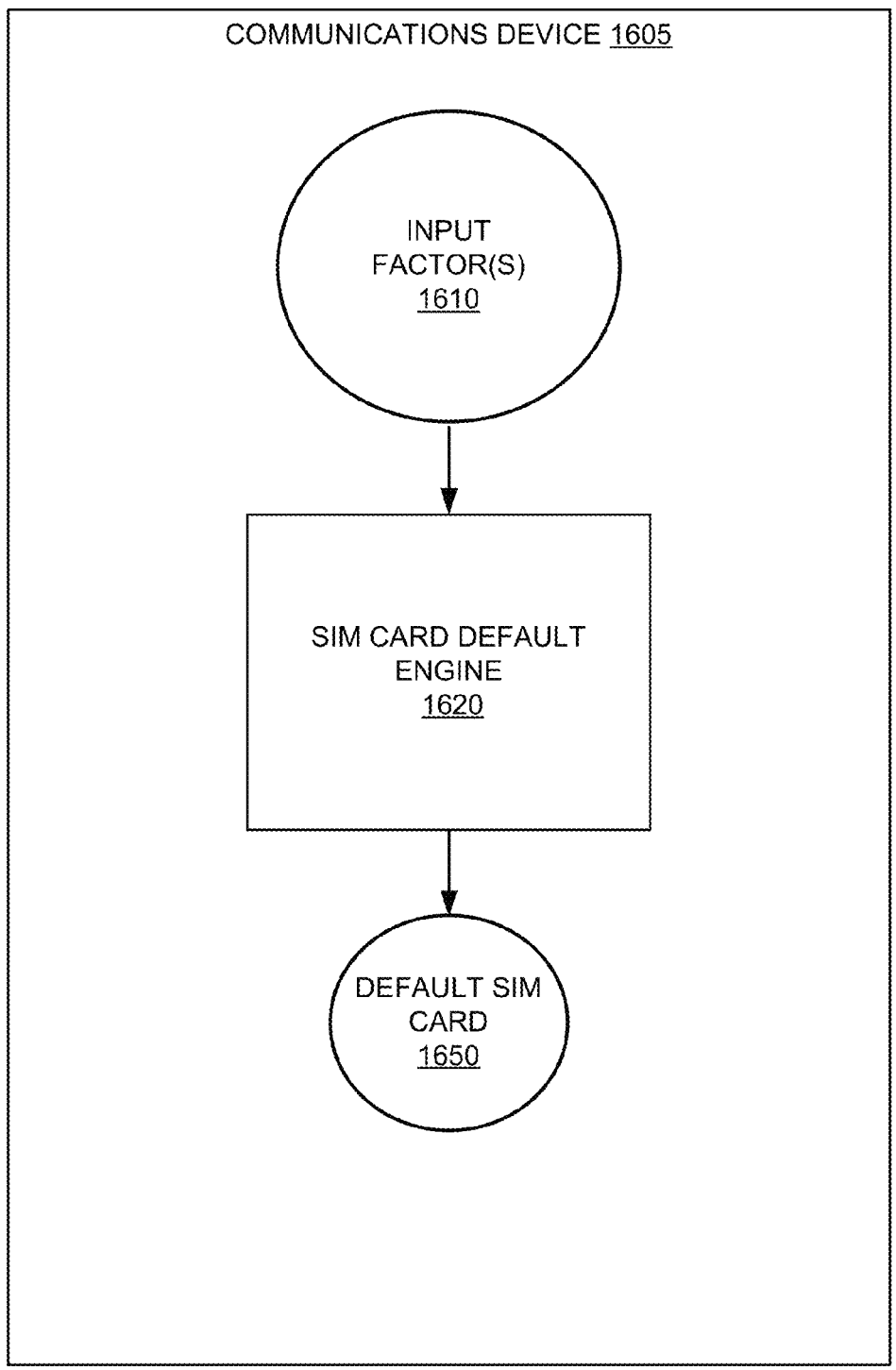
FIG. 16 is a block diagram of an exemplary system choosing a default SIM card.

FIG. 16 is a block diagram of an exemplary system 1600 choosing a default SIM card. In the example, a communications device 1605 comprises a SIM card default engine 1620 that accepts any one or more of the factors 1610 described herein as input and outputs a default SIM card identifier 1650. As described herein, such factors can comprise receiving a change of default via a SIM indicator-switcher as described herein.

Example 34

Exemplary SIM Card Defaults Priority

In any of the examples herein, the default SIM can be chosen according to a priority order. For example, if there has been any communications activity for a contact or contact point, the SIM involved in such communications activity can be used. If there is no communications activity, then other factors can be consulted. For example, if the contact resides on a given SIM card, the given SIM card can be used as the default. If the contact was imported form a given SIM card, the given SIM card can be used as the default. If none of these are true, then a SIM card can simply be picked (e.g., a priority, first SIM card, global default SIM, or the like).

Example 35

Exemplary SIM Card Defaults Based on Associated Account

In any of the examples herein, a SIM card default can be chosen based on the source account associated with a contact (e.g., the account from which the contact originated). Such source accounts can include social networks, email servers, or the like.

A contact can be associated with a particular source account by virtue of originating from the account or otherwise having affinity with the account. In practice, a phone book can comprise the union of accounts and sources that are persisted in the cloud and synchronized to the phone. For example, a social media account can be integrated into the phone book. Affinity with a particular account can be used as a weighted factor when choosing which SIM card to use. The fact that a number originates from a particular account can weigh heavily in the determination, but other associations are possible. And, because a number can originate from multiple accounts, the degree or volume of past communication activity or association can be considered to choose which account predominates.

The nature of the account can be considered to determine whether the account is typically associated with work or personal activity. For example, some social networks have a reputation for being personal, while others have a reputation for being used for work. Some email servers (e.g., the MICROSOFT EXCHANGE server or the like) are associated with work activity. A stored mapping between the account source name or identifier and the activity type (e.g., work, personal) can be consulted. Based on the mapping, a default SIM can be chosen (e.g., a SIM with a name or other association indicating the activity type). Also, user preferences can be provided whereby it can be indicated whether a particular account is a work or personal account.

In another example, past activity on a SIM associated with the same account can also be used to determine default SIM. For example, it can be determined whether there has already been communication activity with other contacts originating from an account. Based on whether a threshold or predominant amount of activity (e.g., majority, 60%, 90%, 100%, or the like) occurs on a given SIM, the default SIM for a contact originating from the same account can be chosen as the given SIM. In other words, if there is a tendency to place calls for contacts from a particular network a certain SIM, then it is likely that it is desired to place calls to other contacts from the same network on the same SIM.

Example 36

Exemplary SIM Card Defaults Based on Number Type Identification

In any of the examples herein, a SIM card default can be chosen based on identification of a type of a callee number. For example, if a number appears to be a business number (e.g., 1-800, is a vanity number, or has an extension), it can result in a work SIM being selected as the default.

Example 37

Exemplary SIM Card Defaults Based on Content

In any of the examples herein, a SIM card default can be chosen based on content of a message associated with a contact or contact point. For example, a voicemail message from a number can be examined or a text message to or from the number can be examined. Such message content can be scanned against a dictionary to determine whether it is a work or personal/home message.

In a particular example, a message containing the word "urgent" or marked as "urgent" may weigh in favor of selecting a work SIM. To further illustrate the flexibility of the technologies in handling a number of input factors, a message that is designated as urgent can override billing preferences in light of detected weak signal strength because it may be desirable to ensure that the message gets out fast and/or reliably, even though it may result in increased cost.

Example 38

Exemplary SIM Card Defaults Based on Callee Location

In any of the examples herein, a SIM card default can be chosen based on a detected location of a callee. For example, an address or area code can be considered to determine whether the communication will be a local or long distance call (or other cost differentiator). The SIM for which the call is local can be selected as the default.

Example 39

Exemplary SIM Card Defaults Based on Communication Type

In any of the examples herein, a SIM card default can be chosen based on preferences indicating that a particular SIM is desired for a particular communication type. For example, a SIM may be favored for voice, text messages, or both.

Example 40

Exemplary SIM Card Defaults Based on Name Association

In any of the examples herein, a SIM card default can be chosen based on name association. For example, if the last name of a contact matches that of the device user, a SIM associated with personal (e.g., family) communication (e.g., by name or other association) can be used as the default SIM.

Example 41

Exemplary SIM Card Defaults Based on Time-of-Day Association

In any of the examples herein, a SIM card default can be chosen based on time-of-day association. For example, a day can be divided into time periods (e.g., hours or the like). It can be determined that communications in a particular time period are predominantly conducted on a given SIM. If so, when making a call during the time period (e.g., on a subsequent day), the default SIM can be set to be the given SIM. Similarly, days of the week can be used to select a default SIM.

Time-of-day can serve as an input into an overall determination. For example, past communication can take precedence, but in the absence of information on such a factor, if it is observed that other calls during the time period are predominantly conducted on a given SIM, the given SIM can be selected as the default. Upon placing the communication with the selected default, the default can then become confirmed and used as the default for future communications.

If there are work appointments (e.g., made with a work account) in proximity to the current time, a work SIM can be selected as the default SIM. The same can be done for personal appointments.

Example 42

Exemplary SIM Card-Activity Type Association

In any of the examples herein, a SIM card can be associated with a particular activity type (e.g., work, personal, or the like). Such an association can be determined based on the friendly name of the SIM card (e.g., "work") or activity on the SIM card (e.g., calls to "home" contact points, family members, or the like). Billing information can also be considered.

It is also possible to simply designate a particular SIM as a work or home/personal SIM via user preferences.

Example 43

Exemplary Default SIM Table

FIG. 17 is a block diagram of an exemplary table 1700 relating contact points and default SIMs and can be used in any of the examples implementing SIM card defaults described herein. In the example, the table 1700 stores a relationship 1730 between a contact point 1730A and a default SIM card 1730B. The default SIM card can be stamped (e.g., stored) upon occurrence of communication events as described herein. In practice, identifiers (e.g., of contact point, contact and number type, or the like) can be used instead of text names or numerical labels.

For example, upon placing a call to a contact point with a given SIM, an identifier of the given SIM can be stored as associated with an identifier of the contact point. Subsequently, the given SIM can be used as a default SIM and displayed as such as described herein.

The Table can be enhanced so that defaults can be stored for specific interfaces. For example, different defaults can be stored for call history, dialer, new conversation, recognized phone number (e.g., edit before call when a number is extracted from a webpage or other content). Defaults can also be set according to communication type (e.g., messaging), resulting in a default for contacts according to the communication type, or finer grained (e.g., for communication type and contact point).

In practice, the table 1700 need not be implemented as a separate table and can be implemented as part of another table (e.g., an address book table, a SIM card configuration table, or the like).

Example 44

Exemplary Contact Card User Interface with Default SIM Cards

Figure 18:
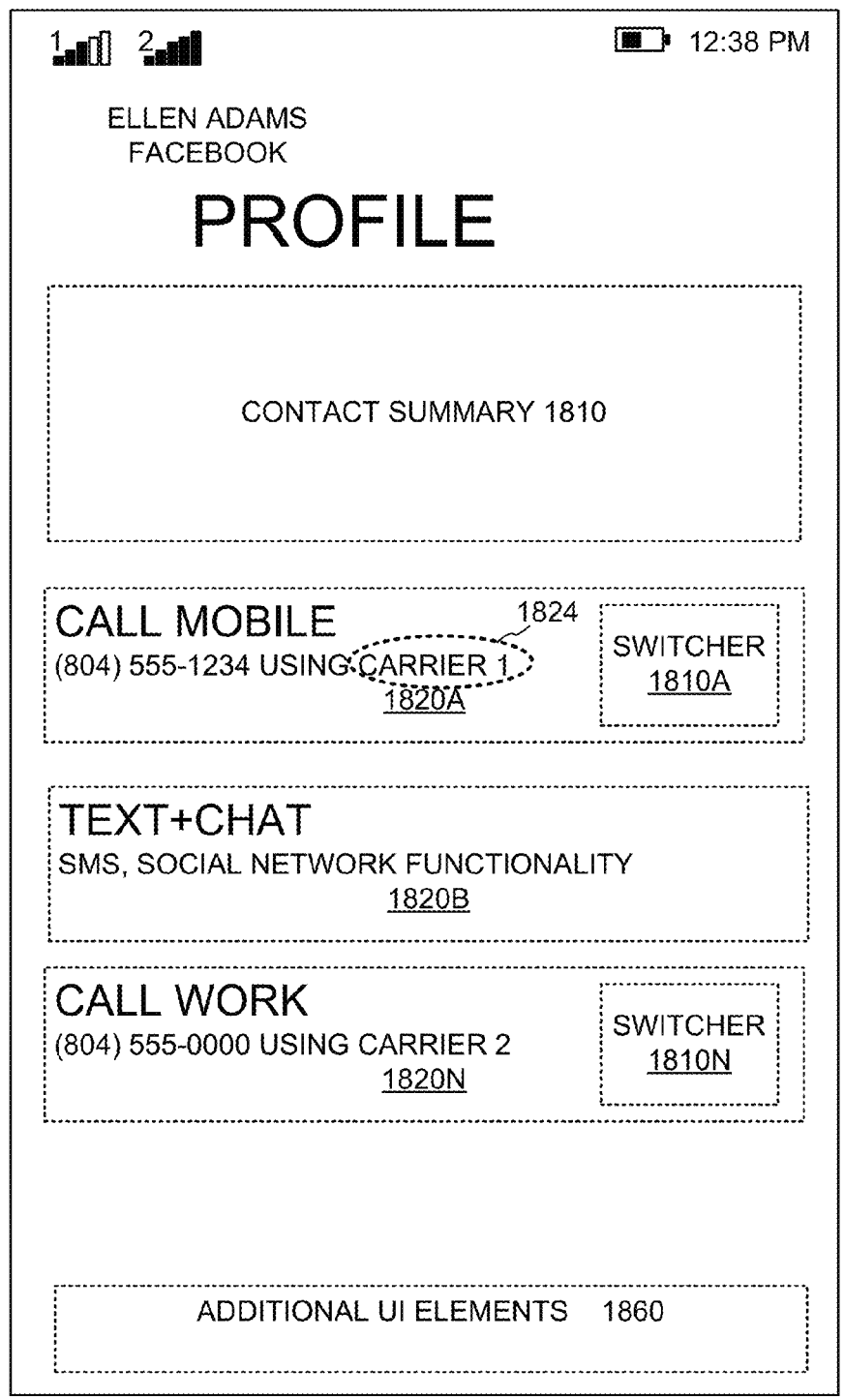
FIG. 18 is a screen shot of an exemplary user interface for showing default SIM cards for contact points when initiating a call from a contact card user interface.

FIG. 18 is a screen shot of an exemplary user interface 1800 for showing default SIM cards for contact points when initiating a call from a contact card user interface. In the example, a contact summary 1810 can portray information about the contact, such as a picture, social network activity, or the like.

The user interface 1800 can be displayed as part of a contact card and can include SIM indicator-switchers 1810A, 1810N that include an indication of a default SIM card. The default SIM card can vary by number type.

A SIM card label 1824 can be displayed as highlighted to indicate a selected (e.g., default) SIM card to which communications will be initiated upon activation of respective number types (e.g., communications to the mobile number can be initiated with a first SIM card default, and communications to the work number can be initiated with a second, different SIM card default). The label 1824 and proximate text can be presented in a color associated with the default SIM card. The number of the contact point (e.g., in conjunction with "using") can be used as an optional description for use with the SIM indicator-switcher.

Upon activation of a contact point 1820A or 1820N, a call is placed using the SIM card indicated by the respective SIM indicator-switcher 1810A, 1810N. For example, communication can be initiated to a non-default SIM by first using the indicator-switcher 1810A (e.g., to select the non-default SIM), observing 1820 change as a result (e.g., to indicate a different SIM), and then tapping or otherwise activating 1820A.

Upon activation of a depiction of the non-default SIM card label in a switcher 1810A, 1810N, communications can be initiated to the contact via the activated non-default SIM card.

Additional user interface elements 1860 appropriate for a contact card user interface can be included.

Example 45

Exemplary Communications Scenario

Efficient Call Placement

Figure 19:
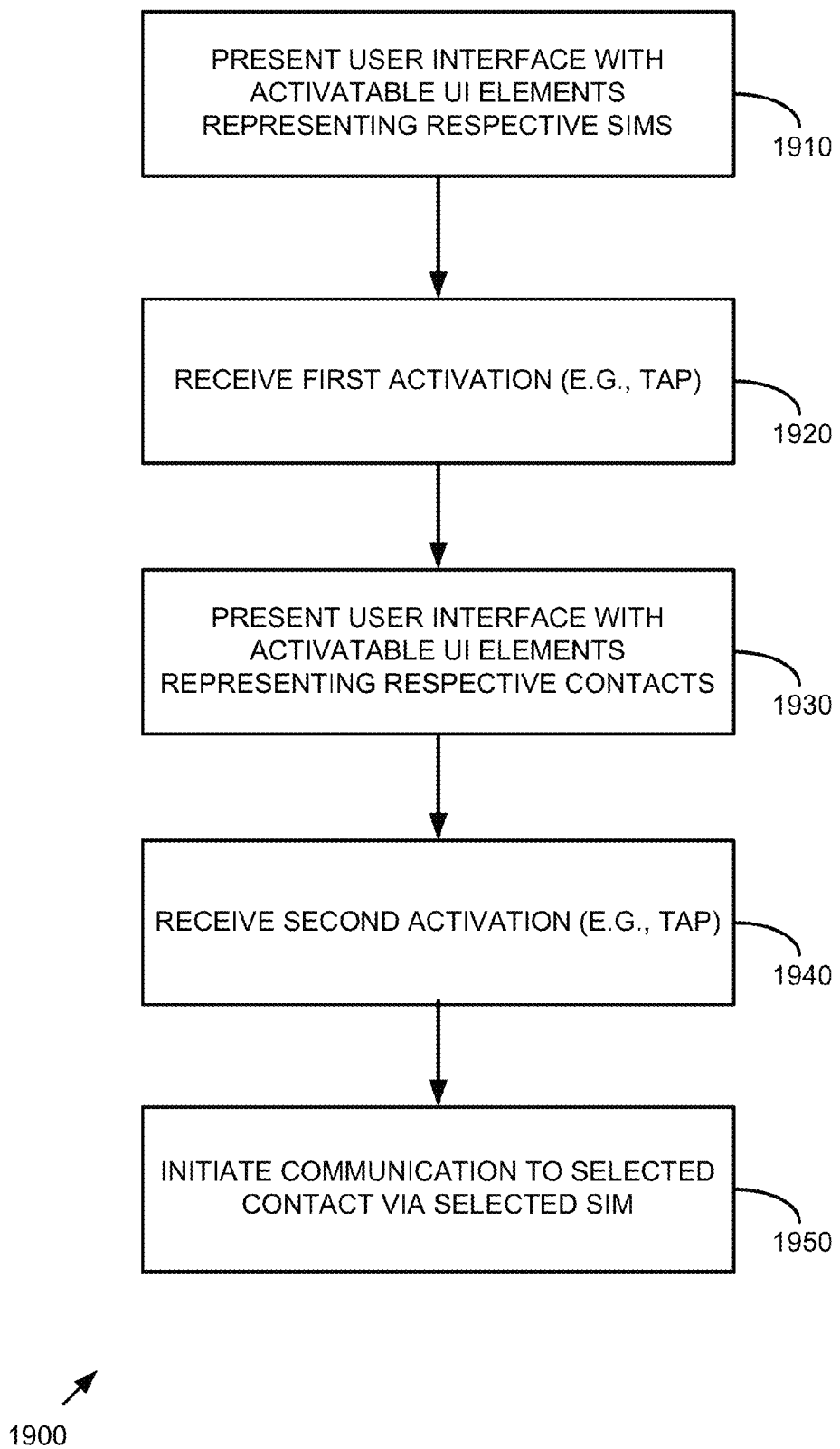
FIG. 19 is a flowchart of an exemplary method of placing a call via the user interfaces described herein.

FIG. 19 is a flowchart of an exemplary method 1900 of placing a call via the user interfaces described herein. Efficient call placement can be achieved via the method 1900.

At 1910, a user interface with activatable user interface elements representing respective SIM cards is presented. For example, the user interface of FIG. 6 can be presented. A first user interface comprising a first activatable user interface element representing call initiation for first SIM card and a second activatable user interface element representing call initiation for a second SIM card can be presented.

At 1920, a first activation is received of one of the activatable user interface elements (e.g., of either 620A or 620B). Such an activation can indicate that call initiation is desired, but can also indicate a desired, selected SIM card (e.g., by virtue of the fact that the user interface element for a given SIM card was activated). In this way, a single activation can both indicate initiation of communications and the SIM card for carrying out the communications.

At 1930, responsive to receiving the first activation, a user interface with activatable user interface elements representing respective contacts is presented. For example, the user interface of FIG. 9 (e.g., a call history) can be presented, which comprises a plurality of user interface elements for placing calls using the SIM selected at 1920. The user interface can implement the SIM-separated user interface paradigm for the SIM card selected by virtue of activating the first activatable user interface element or the second user interface element.

At 1940, a second activation is received (e.g., of a represented call 922 or 920A in the call history). The activation indicates a particular contact point.

At 1950, responsive to receiving the second activation, a call is placed to the selected contact point (e.g., a number associated with the call) via the selected SIM.

User interface interaction for initiating the communication can consist of the first activation and the second activation. By supporting communications initiation with only two activations, regardless of the number of SIMs, more efficient initiation of communications can be achieved.

Via the user interfaces, an indication that the SIM card selected (e.g., which becomes the default SIM card) is to be switched to a different SIM card can be received (e.g., via a SIM indicator-switcher described herein). As a result, the call is placed with the different SIM card.

Example 46

Exemplary Communications Scenario

Conversation Triage

The features described herein can be used in a conversation triage scenario for a single SIM while still supporting SIM-aggregated conversations. For example, referring back to FIG. 2, the first user interface can comprise a conversation list user interface (e.g., as described herein) presenting a summary of a plurality of conversations according to a SIM-separated user interface paradigm. For example, responsive to activation of an activatable user interface element for messaging for a particular SIM card, the first user interface can be presented.

The second user interface (e.g., a conversations user interface as described herein) can be displayed responsive to activation of a particular conversation out of the plurality of conversations and presents a list of messages for the particular conversation according a SIM-aggregated user interface paradigm.

Example 47

Exemplary SIM Card Colors

In any of the examples herein, features can be used to assist in selection of colors for representing SIM cards. For example, if a user chooses an accent color for the communications device (e.g., to be used throughout user interfaces for the device to provide color unity across user interfaces), the accent color can be used in association with one of the SIM cards (e.g., the primary SIM card, such as SIM 1). A user interface can be provided by which the default (e.g., accent) color can be changed to that of a user's liking.

A lookup table of colors that are aesthetically pleasing in combination with (e.g., complementary) respective colors can be consulted to choose a color for a second SIM, based on the color associated with the first SIM card. Thus, a color that is complementary to an accent color for user interfaces of the communications device can be chosen as the color associated with a SIM card. Again, a user interface can be provided by which the chosen color can be changed to an arbitrary color of the user's liking.

Example 48

Exemplary Consistent User Interfaces

A plurality of user interfaces for accommodating a plurality of SIM cards can be displayed, wherein the user interfaces both indicate a default SIM card and allow switching of the default SIM card. The user interfaces can consistently display the default SIM card in a like manner and consistently accept switching in a like manner. For example, a SIM card indicator-switcher can be used across the user interfaces, including a call history user interface, a keypad user interface, a conversation user interface, and a contact card user interface. Such an approach can provide the user with a consistent experience regardless of the communications scenario.

The user interface can further be consistent across user interfaces implementing SIM-separated or SIM-aggregated user interface paradigm. For example, a call history user interface can implement an indicator-switcher whether it implements a SIM-separated or SIM-aggregated user interface paradigm. A conversation user interface can do the same.

Example 49

Exemplary Advantages

The technologies can display and provide quick access to communication separated by line. The technologies can provide glanceable indications of which line was used when receiving a communication and when displaying communication history. The technologies can provide easy and intuitive access to switch lines whenever a user can initiate or respond to communication. The technologies can provide an integrated experience across communication lines while still maintaining and displaying line history for respective communicated items. The technologies can provide the ability to easily switch between separated and aggregated paradigms per communication type.

The technologies described herein can address the needs of social circle dual SIM phone users and provide them with a simple model for segregating their communication according to phone line. Social circle users are people who want to separate different parts of their lives. A common example is separating work and personal life and maintaining different identities and different communication points for the different sets of users. Often times, communication to one of the social circles is a lower priority (e.g., personal is a lower priority when the user is at work), and maintaining privacy on the personal number is important.

Because the technologies herein allow a user to easily determine which SIM card is involved in both incoming and outgoing communications, the user is able to easily separate the identities and maintain privacy as desired.

Example 50

Exemplary Computing Systems

Figure 20:
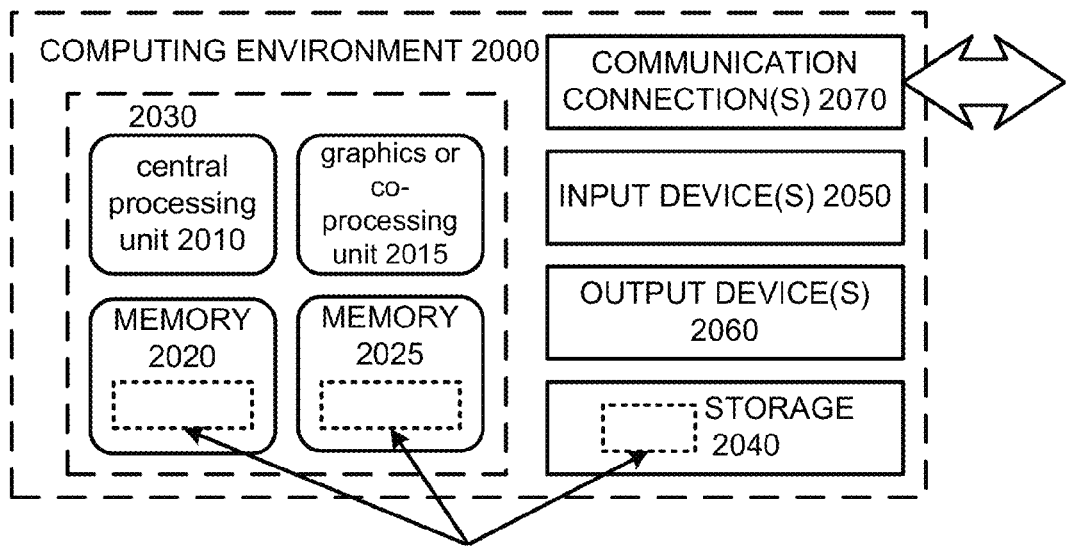
FIG. 20 is a diagram of an exemplary computing system in which some described embodiments can be implemented.

FIG. 20 illustrates a generalized example of a suitable computing system or environment 2000 in which several of the described innovations may be implemented. The computing system 2000 is not intended to suggest any limitation as to scope of use or functionality, as the innovations may be implemented in diverse general-purpose or special-purpose computing systems. A communications device as described herein can take the form of the described computing system 2000.

With reference to FIG. 20, the computing system 2000 includes one or more processing units 2010, 2015 and memory 2020, 2025. In FIG. 20, this basic configuration 2030 is included within a dashed line. The processing units 2010, 2015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 20 shows a central processing unit 2010 as well as a graphics processing unit or co-processing unit 2015. The tangible memory 2020, 2025 may be volatile memory (e.g., registers, cache, RAM), non-volatile memory (e.g., ROM, EEPROM, flash memory, etc.), or some combination of the two, accessible by the processing unit(s). The memory 2020, 2025 stores software 2080 implementing one or more innovations described herein, in the form of computer-executable instructions suitable for execution by the processing unit(s).

A computing system may have additional features. For example, the computing system 2000 includes storage 2040, one or more input devices 2050, one or more output devices 2060, and one or more communication connections 2070. An interconnection mechanism (not shown) such as a bus, controller, or network interconnects the components of the computing system 2000. Typically, operating system software (not shown) provides an operating environment for other software executing in the computing system 2000, and coordinates activities of the components of the computing system 2000.

The tangible storage 2040 may be removable or non-removable, and includes magnetic disks, magnetic tapes or cassettes, CD-ROMs, DVDs, or any other medium which can be used to store information in a non-transitory way and which can be accessed within the computing system 2000. The storage 2040 stores instructions for the software 2080 implementing one or more innovations described herein.

The input device(s) 2050 may be a touch input device such as a keyboard, mouse, pen, or trackball, a voice input device, a scanning device, or another device that provides input to the computing system 2000. For video encoding, the input device(s) 2050 may be a camera, video card, TV tuner card, or similar device that accepts video input in analog or digital form, or a CD-ROM or CD-RW that reads video samples into the computing system 2000. The output device(s) 2060 may be a display, printer, speaker, CD-writer, or another device that provides output from the computing system 2000.

The communication connection(s) 2070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system 2000, computer-readable media include memory 2020, 2025, storage 2040, and combinations of any of the above.

The innovations can be described in the general context of computer-executable instructions, such as those included in program modules, being executed in a computing system on a target real or virtual processor (e.g., which is ultimately executed in hardware). Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 51

Exemplary Mobile Device

Figure 21:
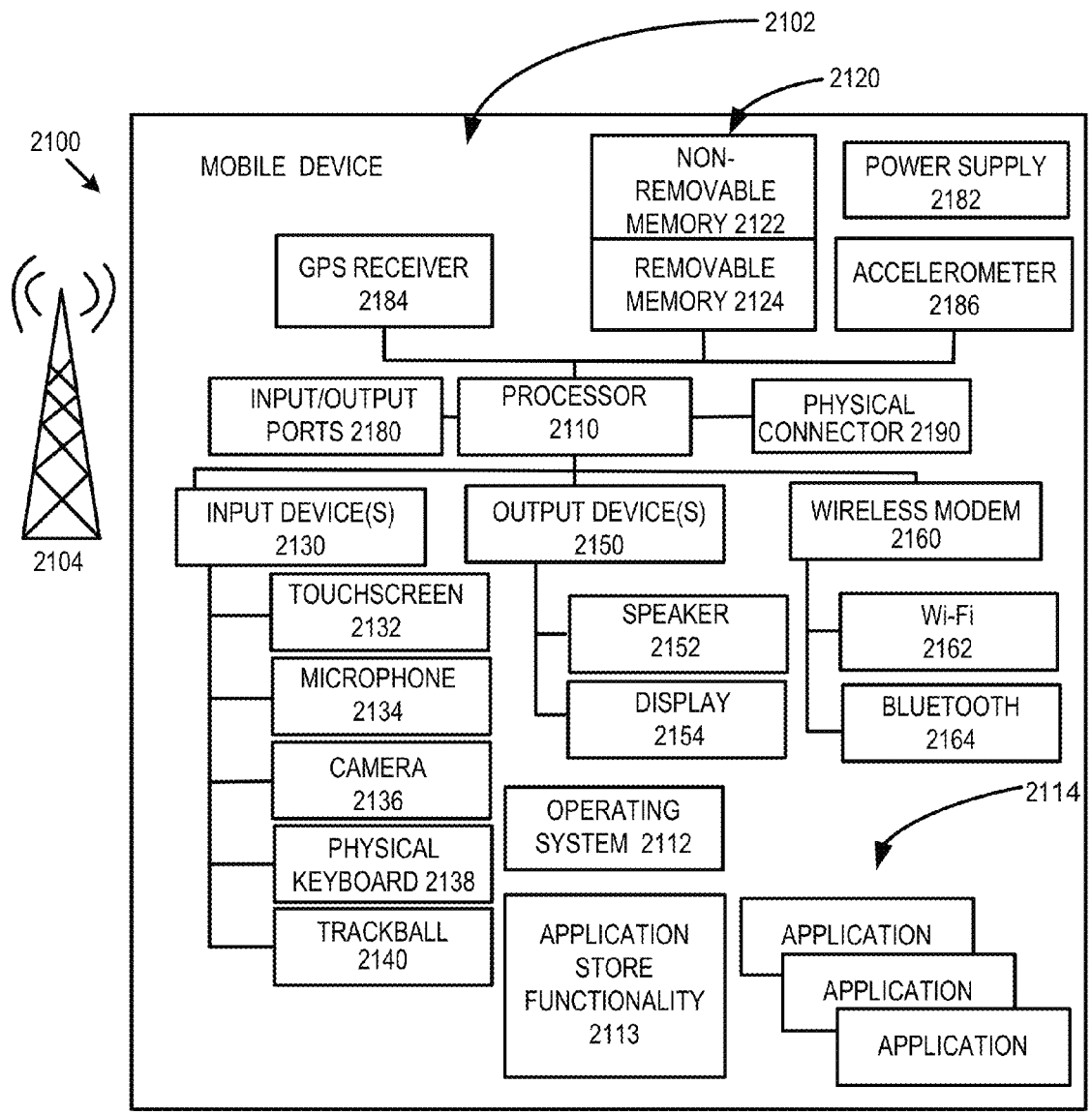
FIG. 21 is an exemplary mobile device that can be used for the technologies described herein.
Figure 22:
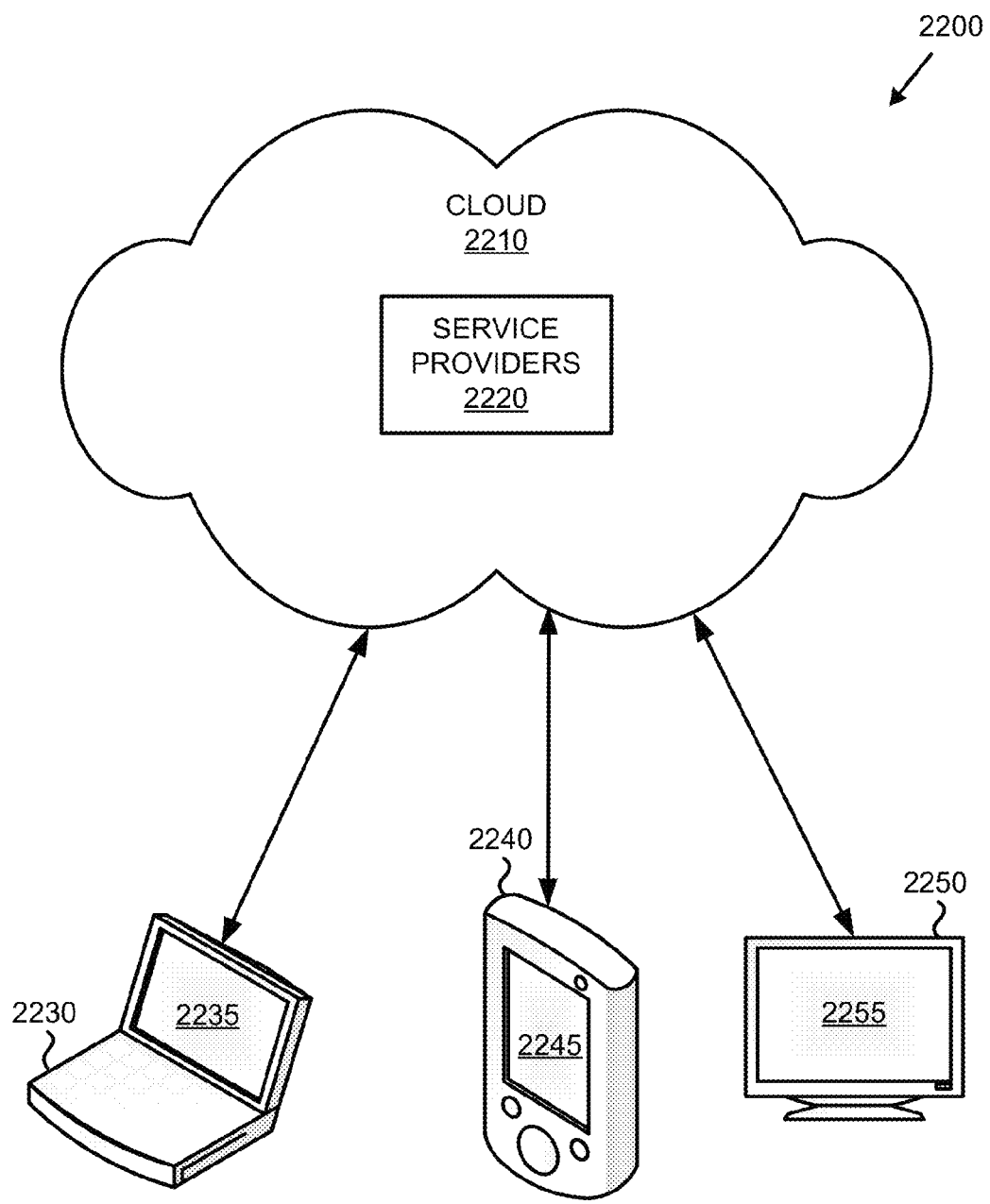
FIG. 22 is an exemplary cloud-support environment that can be used in conjunction with the technologies described herein.

FIG. 21 is a system diagram depicting an exemplary mobile device 2100 including a variety of optional hardware and software components, shown generally at 2102. Any components 2102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 2104, such as a cellular, satellite, or other network. Voice over IP scenarios (e.g., over WiFi or other network) can also be supported. The communication devices described herein can take the form of the described mobile device 2100.

The illustrated mobile device 2100 can include a controller or processor 2110 (e.g., signal processor, microprocessor, ASIC, or other control and processing logic circuitry) for performing such tasks as signal coding, data processing, input/output processing, power control, and/or other functions. An operating system 2112 can control the allocation and usage of the components 2102 and support for one or more application programs 2114. The application programs 2114 can include common mobile computing applications (e.g., email applications, calendars, contact managers, web browsers, messaging applications), or any other computing application. Functionality 2113 for accessing an application store can also be used for acquiring and updating applications 2114.

The illustrated mobile device 2100 can include memory 2120. Memory 2120 can include non-removable memory 2122 and/or removable memory 2124. The non-removable memory 2122 can include RAM, ROM, flash memory, a hard disk, or other well-known memory storage technologies. The removable memory 2124 can include flash memory or a Subscriber Identity Module (SIM) card, which is well known in GSM communication systems, or other well-known memory storage technologies, such as "smart cards." The memory 2120 can be used for storing data and/or code for running the operating system 2112 and the applications 2114. Example data can include web pages, text, images, sound files, video data, or other data sets to be sent to and/or received from one or more network servers or other devices via one or more wired or wireless networks. The memory 2120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 2100 can support one or more input devices 2130, such as a touch screen 2132, microphone 2134, camera 2136, physical keyboard 2138 and/or trackball 2140 and one or more output devices 2150, such as a speaker 2152 and a display 2154. Other possible output devices (not shown) can include piezoelectric or other haptic output devices. Some devices can serve more than one input/output function. For example, touchscreen 2132 and display 2154 can be combined in a single input/output device.

A wireless modem 2160 can be coupled to an antenna (not shown) and can support two-way communications between the processor 2110 and external devices, as is well understood in the art. The modem 2160 is shown generically and can include a cellular modem for communicating with the mobile communication network 2104 and/or other radio-based modems (e.g., Bluetooth 2164 or Wi-Fi 2162). The wireless modem 2160 is typically configured for communication with one or more cellular networks, such as a GSM or CDMA network for data and voice communications within a single cellular network, between cellular networks, or between the mobile device and a public switched telephone network (PSTN).

The mobile device 2100 can further include at least one input/output port 2180, a power supply 2182, a satellite navigation system receiver 2184, such as a Global Positioning System (GPS) receiver, an accelerometer 2186, and/or a physical connector 2190, which can be a USB port, IEEE 1394 (FireWire) port, and/or RS-232 port. The illustrated components 2102 are not required or all-inclusive, as any components can deleted and other components can be added.

Example 52

Exemplary Cloud-Supported Environment

In example environment 2200, the cloud 2210 provides services for connected devices 2230, 2240, 2250 with a variety of screen capabilities. Connected device 2230 represents a device with a computer screen 2235 (e.g., a mid-size screen). For example, connected device 2230 could be a personal computer such as desktop computer, laptop, notebook, netbook, or the like. Connected device 2240 represents a device with a mobile device screen 2245 (e.g., a small size screen). For example, connected device 2240 could be a mobile phone, smart phone, personal digital assistant, tablet computer, and the like. Connected device 2250 represents a device with a large screen 2255. For example, connected device 2250 could be a television screen (e.g., a smart television) or another device connected to a television (e.g., a set-top box or gaming console) or the like. One or more of the connected devices 2230, 2240, 2250 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 2200. For example, the cloud 2210 can provide services for one or more computers (e.g., server computers) without displays.

Services can be provided by the cloud 2210 through service providers 2220, or through other providers of online services (not depicted). For example, cloud services can be customized to the screen size, display capability, and/or touch screen capability of a particular connected device (e.g., connected devices 2230, 2240, 2250).

In example environment 2200, the cloud 2210 provides the technologies and solutions described herein to the various connected devices 2230, 2240, 2250 using, at least in part, the service providers 2220. For example, the service providers 2220 can provide a centralized solution for various cloud-based services. The service providers 2220 can manage service subscriptions for users and/or devices (e.g., for the connected devices 2230, 2240, 2250 and/or their respective users).

Example 53

Exemplary Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Non-Transitory Computer-Readable Media

Any of the computer-readable media herein can be non-transitory (e.g., memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Exemplary Combinations

Various combinations can be supported. For example, the incoming call user interface can be combined with the call-in-progress user interface (e.g., after the incoming call is accepted). The call-in-progress user interface can be combined with the background call-in-progress user interface (e.g., if the call moves to the background).

The call-in-progress user interface can be combined with the home user interface (e.g., if navigation occurs to the home user interface during a call). In such a case, the background call-in-progress user interface can also be displayed.

The user interface for initiating communications can be combined with any of the other user interfaces as well.

Alternatives

The technologies from any example can be combined with the technologies described in any one or more of the other examples. Where the word "exemplary" is used, it is intended to indicate an example and not an ideal embodiment. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method implemented at least in part by a computing system, the method comprising:
   selecting a default subscriber identity module (SIM) card;
   displaying a user interface depicting a plurality of contact points for a contact and an activatable user interface element for initiating communications with a particular contact point for the contact;
   receiving an activation of the user interface element;
   responsive to activation of the user interface element, initiating communications with the particular contact point via the default SIM subscriber identity module card; and
   for another of the contact points of the contact, presenting a different subscriber identity module card as a default.

2. The method of claim 1 wherein:
   selecting the default subscriber identity module card comprises selecting a subscriber identity module card most recently used for the contact.

3. The method of claim 2 further comprising:
   propagating the default subscriber identity module card to a different contact point for the contact.

4. The method of claim 1 wherein:
   selecting the default subscriber identity module card comprises selecting a subscriber identity module card involving communication activity with the particular contact point.

5. The method of claim 1 wherein:
   selecting the default subscriber identity module card comprises selecting a subscriber identity module card from which an incoming message was received from the contact point.

6. The method of claim 1 wherein:
   selecting the default subscriber identity module card comprises selecting a subscriber identity module card based on a source account from which the contact originated.

7. The method of claim 6 further comprising:
   determining that communication activity with other contacts originating from the source account is predominantly conducted with a particular subscriber identity module;
   wherein selecting the default subscriber identity module card comprises selecting the particular subscriber identity module responsive to the determining.

8. The method of claim 1 further comprising:
   determining that communications in a particular time period are conducted on a given subscriber identity module; and
   selecting the default subscriber identity module card comprises selecting the given subscriber identity module.

9. The method of claim 1 further comprising:
   determining that a last name of the contact matches that of a device user;
   wherein selecting the default subscriber identity module card comprises, responsive to determining that the last name of the contact matches that of the device user, selecting a subscriber identity module card associated with personal activity.

10. The method of claim 1 wherein:
    the user interface comprises a label of the default subscriber identity module card proximate information for the contact.

11. The method of claim 10 wherein:
    the label of the default subscriber identity module card is displayed as part of a subscriber identity module card indicator-switcher user interface element collection.

12. The method of claim 11 further comprising:
    receiving an indication to override the default subscriber identity module card via a user interface element in the collection.

13. The method of claim 1 further comprising:
    overriding the selected default subscriber identity module card based on signal strength associated with the default subscriber identity module card.

14. The method of claim 1 further comprising:
    overriding the selected default subscriber identity module card based on content of a message associated with the contact or contact point.

15. The method of claim 1 further comprising:
    overriding the selected default subscriber identity module card based on do not disturb functionality.

16. The method of claim 1 further comprising:
    overriding the selected default subscriber identity module card based on billing arrangements.

17. The method of claim 1 further comprising:
    storing a mapping of contact points to default subscriber identity module cards in a table;
    wherein selecting the default subscriber identity module card consults the table.

18. A system for implementing default subscriber identity module (SIM) cards, the system comprising:
    a processor;
    memory coupled to the processor;
    a subscriber identity module card default engine configured to output a default subscriber identity module card; and
    a default subscriber identity module card table, wherein the default subscriber identity module card table comprises a mapping between contact points and a default subscriber identity module, wherein the default subscriber identity module card table supports different default subscriber identity modules for different contact points of a same contact.

19. The system of claim 18 wherein:
the subscriber identity module card default engine is configured to select a default subscriber identity module based on communications activity with the contact.

20. One or more computer-readable storage media comprising computer-executable instructions causing a computer to perform a method of selecting a default subscriber identity module (SIM) card for a contact point associated with a contact, the method comprising:
receiving a plurality of input factors comprising a source of the contact point;
selecting a default subscriber identity module card for the contact point based on the source of the contact point, wherein the selecting further supports factors comprising a subscriber identity module card on which the contact point resides, a subscriber identity module card from which the contact point was imported, and a subscriber identity module card most recently involved in communications activity with the contact point; and
subsequently overriding the default subscriber identity module card selected for the contact point, wherein the overriding supports factors comprising explicit selection received from a user interface and signal strength associated with the default subscriber identity module card.

* * * * *